US012223231B2

(12) United States Patent
Marroquin et al.

(10) Patent No.: US 12,223,231 B2
(45) Date of Patent: Feb. 11, 2025

(54) METHOD OF TRANSFORMING A HUMAN-READABLE DATASET DEFINING ARCHITECTURAL FEATURES INTO USABLE INSTRUCTIONS THAT CAN BE INTERPRETED BY A SECOND MORE SOPHISTICATED ARCHITECTURAL CAD SOFTWARE

(71) Applicant: BRPH Architects Engineers, Inc., Melbourne, FL (US)

(72) Inventors: Henry Alexander Marroquin, Melbourne, FL (US); Mark Elton Myers, Melbourne, FL (US)

(73) Assignee: BRPH PLLC, Melbourne, FL (US)

( * ) Notice: Subject to any disclaimer, the term of this patent is extended or adjusted under 35 U.S.C. 154(b) by 932 days.

(21) Appl. No.: 17/303,289

(22) Filed: May 26, 2021

(65) Prior Publication Data
US 2022/0382924 A1    Dec. 1, 2022

(51) Int. Cl.
*G06F 30/12*    (2020.01)
*G06F 30/13*    (2020.01)
*G06F 40/205*    (2020.01)

(52) U.S. Cl.
CPC .............. *G06F 30/12* (2020.01); *G06F 30/13* (2020.01); *G06F 40/205* (2020.01)

(58) Field of Classification Search
CPC ........ G06F 30/00; G06F 30/12; G06F 40/205; G06F 2119/20
USPC ........................................................... 703/1
See application file for complete search history.

(56) References Cited

U.S. PATENT DOCUMENTS

2021/0073433 A1*    3/2021    Austern .................. G06F 30/13

OTHER PUBLICATIONS

YIn, Xuetao et al., "Generating 3D Building Models from Architectural Drawings: A Survey", 2009, IEEE Computer Society. (Year: 2009).*
Jain, Mahak et al., "A Framework for the Conversion of Textual BigData into 2D Architectural Floor Plan", 2019, IEEE Fifth International Conference on Multimedia Big Data (BIGMM), IEEE. (Year: 2019).*

(Continued)

*Primary Examiner* — Cedric Johnson
(74) *Attorney, Agent, or Firm* — Daniel C. Pierron; Widerman Malek PL

(57) ABSTRACT

A method for generating computer-readable instructions to automatically generate a three-dimensional architectural model including: receiving a human-readable text file comprising a description of functional elements of a structure, parsing the text file to identify keywords comprised by the text file, generating a plurality of datasets responsive to the key words; generating instructions to create level objects responsive to the datasets, instructions to create floor objects responsive to the datasets and the level objects, instructions to create exterior wall objects responsive to the plurality of datasets and the one or more level objects, instructions to create interior wall objects responsive to the and level objects, instructions to create room objects responsive to the datasets, level objects, exterior wall objects, and interior wall objects, and providing the instructions to architectural modeling software.

19 Claims, 36 Drawing Sheets

(56) References Cited

OTHER PUBLICATIONS

Gerstweiler Georg et al: "Extraction of Structural and Semantic Data from 2D Floor Plans for Interactive and Immersive VR Real Estate Exploration", Technologies, vol. 6, No. 101, Nov. 4, 2018 (Nov. 4, 2018), pp. 1-27, XP055873140, DOI: 10.3390/technologies6040101, abstract, p. 6, paragraph 1-p. 18, paragraph 1, figures 1-16.
World Intellectual Property Office, International Search Report, Authorized Officer Sohrt, Wolfgang, Application No. PCT/US2021/071251, mailed on Feb. 24, 2022.

\* cited by examiner

600

- 602 — Define a face orientation vector for each block face in (X, Y, Z) coordinates
- 604 — Identify each block face having a face orientation vector having a non-zero value in only the Z coordinate

- 702 — Identify a level object having a Z coordinate value equal to the center point Z value for the room
- 704 — Assign the level number associated with the selected level object

- 802 — Identify a name of the list of room names associated with the room
- 804 — Assign room object a name the same as identified name

- 902 — Determine number of discrete rooms comprised by the room list
- 904 — Sequentially assign room number to each room object

METHOD OF TRANSFORMING A HUMAN-READABLE DATASET DEFINING ARCHITECTURAL FEATURES INTO USABLE INSTRUCTIONS THAT CAN BE INTERPRETED BY A SECOND MORE SOPHISTICATED ARCHITECTURAL CAD SOFTWARE

FIELD OF THE INVENTION

The present invention relates to systems and methods for automatically generating machine-readable instructions to generate a three dimensional model of an architectural design for architectural modeling software based on a human-readable file.

BACKGROUND OF THE INVENTION

Computer-controlled architectural modeling has greatly accelerated the design of buildings by reducing the amount of time needed to draft architectural drawings, having the concordant effect of reducing the cost associated with preparing such drawings. Three dimensional models of architectural designs are created by the user inputting all relevant structural features of a building, which are then interpreted by software running on a computer to create a mathematical representation of the architectural design of the building that may be presented in a graphical representation to the user, such that they may see their design prior to construction.

In all architectural drafting software, there are differing levels of assumptions regarding the architectural features and specifications taken by the software to facilitate construction of the computer model. Software that makes fewer assumptions enables greater user control, but also demands that the user provide all the information needed that would otherwise be assumed. This has the end result of requiring the user to spend more time constructing an architectural model in such software. Conversely, software that makes more assumptions gives the user less freedom and control in making the architectural design but requires much less time for its creation. These gaps in both the speed with which architectural designs can be created and the level of detailed control necessary to generate a final architectural design have resulted in these two types of software generating end-product files that are not compatible with each other, meaning the file comprising the architectural model generated by the software that makes more assumptions is inoperable with the software that makes fewer assumptions. Moreover, the file generated by the second type of software is commonly human-readable and readily able to be parsed by a computer. The fundamental differences in the file types has heretofore prevented the conversion of the second software's file to a type that may be utilized by the more sophisticated first type of software. Accordingly, there is a need in the art for a solution to transform files generated by comparatively simple architectural modeling software into information that can be utilized by more complex architectural modeling software for the generation of a three-dimensional architectural model of a building.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to systems and methods for generating computer-readable instructions to automatically generate a three-dimensional architectural model. An inventive method may comprise receiving a human-readable text file comprising a description of functional elements of a structure and parsing the text file to identify keywords comprised by the text file, defining identified key words. The method may further comprise generating a plurality of datasets responsive to the identified key words, generating machine-readable instructions to create one or more level objects responsive to the plurality of datasets, generating machine-readable instructions to create one or more floor objects responsive to the plurality of datasets and the one or more level objects, generating machine-readable instructions to create a plurality of exterior wall objects responsive to the plurality of datasets and the one or more level objects, generating machine-readable instructions to create a plurality of interior wall objects responsive to the plurality of datasets and the one or more level objects, generating machine-readable instructions to create a plurality of room objects responsive to the plurality of datasets, the one or more level objects, the plurality of exterior wall objects, and the plurality of interior wall objects, and providing each of the machine-readable instructions to create one or more level objects, instructions to create one or more floor objects, instructions to create a plurality of exterior wall objects, instructions to create a plurality of interior wall objects, and instructions to create a plurality of room objects to architectural modeling software.

In some embodiments, the plurality of datasets may comprise a dataset of a list of the rooms comprised by the architectural model, a dataset of a geometric center point for each room comprised by the architectural model, defining a center point list, and a dataset of geometric dimensions for each room comprised by the architectural model, defining a dimensions list. The geometric center point for each room may be provided in (X, Y, Z) coordinates. Generating machine-readable instructions to create one or more level objects may comprise generating a dataset comprising a list of the Z-coordinate for each room, defining a Z-coordinate list, identifying each unique Z-coordinate comprised by the Z-coordinate list, assigning a level number to each unique Z-coordinate, and generating a dataset comprising a list of the level numbers, defining a level list.

In some embodiments, the geometric dimensions of each room may be provided in (X, Y, Z) coordinates. Generating machine-readable instructions to create one or more floor objects may comprise generating a composite block model, comprising generating a block center point at the geometric center point for each room, resulting in a plurality of block center points, generating a block having dimensions equal to the geometric dimensions of each room, the block being centered at the block center point, resulting in a plurality of blocks, and merging the plurality of blocks into a single contiguous multifaceted mass, defining the composite block model. Generating machine-readable instructions to create one or more floor objects may further comprise generating a maximum dimension block model being dimensioned and positioned such that its outer dimensions are coextensive with the maximum and minimum (X, Y) coordinates of the composite block model, generating a plurality of interim floor markers having (X, Y) dimensions that are coextensive with the (X, Y) dimensions of the maximum dimension block model, where each interim floor marker has a Z value equal to the Z value for each level object, identifying intersections between the maximum dimension block model and the plurality of interim floor markers, defining interim floor marker intersections, and generating a plurality of floor model objects, each floor model object having a Z value equal to the Z value for one of the plurality of interim floor markers and a boundary defined by the interim floor marker intersections.

In some embodiments, generating a maximum dimension block model may comprise identifying the plurality of faces comprised by the composite block model and removing the horizontal faces of the plurality of faces comprised by the composite block model. In further embodiments, generating machine-readable instructions to create a plurality of exterior wall objects may comprise generating a plurality of exterior wall objects based on the interim floor marker intersections, defining a base height value for each exterior wall object, the base height value being equal to the Z value for the level object associated with each exterior wall, and defining a top height value for each exterior wall object, the top height value being equal to the Z value for the level object having a level number that is the next greater level number than the level number of the level object associated with the exterior wall. In some embodiments, the method may further comprise receiving an indication of an exterior wall type from a user for each exterior wall object, defining received exterior wall type indications and defining an exterior wall type for each exterior wall object responsive to the received exterior wall type indications.

In some embodiments, generating machine-readable instructions to create a plurality of interior wall objects may comprise identifying each face of the plurality of blocks, defining a plurality of block faces, each block face comprising boundary coordinates, identifying each face of the maximum dimension block model, defining a plurality of exterior faces, identifying each block face of the plurality of blocks that at least partially overlaps an exterior face of the plurality of exterior faces, defining a first plurality of excluded faces, identifying each block face of the plurality of blocks that is parallel to the level objects, defining a second plurality of excluded faces, generating a list of interior faces, comprising removing each of the first plurality of excluded faces and the second plurality of excluded faces from the plurality of block faces, identifying intersections between the faces comprised by the list of interior faces and the interim floor markers, defining a plurality of intersection segments, generating an interior wall object for each intersection segment of the plurality of intersection segments, defining a base height value for each interior wall object, the base height value being a Z value of a lower level object the interior wall object intersects with, and defining a top height value for each interior wall object, the top height value being one of a Z value of an upper level object the interior wall object intersects with, a height value received from a user, a default height value, and a maximum height of the architectural model.

In some embodiments, generating machine-readable instructions to create a plurality of interior wall objects may comprise defining a face orientation vector for each block face in (X, Y, Z) coordinates, the face orientation vector being orthogonal to a plane defined by the boundary coordinates and identifying each block face having a face orientation vector having a non-zero value in only the Z coordinate, defining a second plurality of excluded faces.

In some embodiments, generating machine-readable instructions to create a plurality of room objects may comprise defining a location of each room object, defining a level of each room object, assigning a name to each room object, and assigning a room number to each room object. In some further embodiments, each room object may be associated with a room of the list of rooms. The plurality of datasets may further comprise a list of room names, each room name being associated with a room of the list of rooms. Further, defining a location of each room object may comprise defining a center point for each room object that is equal to the center point of an associated room of the list of rooms. Additionally, defining a level of each room object may comprises identifying a level object having a Z coordinate value equal to the center point Z value for the room, defining a selected level object and assigning the level number associated with the selected level object as the level for the room object. Furthermore, assigning a name to each room object may comprise identifying a name of the list of room names associated with the room with which the room object is associated, defining an identified name and assigning the room object a name that is the same as the identified name. Assigning a room number may comprise determining the number of discrete rooms comprised by the room list and sequentially assigning a room number to each room object such that a final room number assigned is equal to the number of discrete rooms comprised by the room list.

In some embodiments, the plurality of datasets may further comprise a list of departments, wherein each room of the list of rooms is associated with a department of the list of departments. The method may further comprise defining a department for each room object, comprising identifying a department of the list of departments associated with the room of the list of rooms each room object is associated with, defining a matched department and assigning the matched department as a department for the room object.

BRIEF DESCRIPTION OF THE DRAWINGS

Some embodiments of the present invention are illustrated as an example and are not limited by the figures of the accompanying drawings, in which like references may indicate similar elements.

FIG. 6 is a flowchart illustrating a further method additional to FIG. 5 according to an embodiment of the invention.

FIG. 7 is a flowchart illustrating a further method additional to FIG. 6 according to an embodiment of the invention.

FIG. 8 is a flowchart illustrating a further method additional to FIG. 7 according to an embodiment of the invention.

FIG. 9 is a flowchart illustrating a further method additional to FIG. 8 according to an embodiment of the invention.

FIG. 10 is an example human-readable text file from which machine-readable instructions to generate a three-dimensional architectural model may be generated according to an embodiment of the invention.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a system and methods for generating computer-readable instructions to automatically generate a three-dimensional architectural model.

Figure 1:
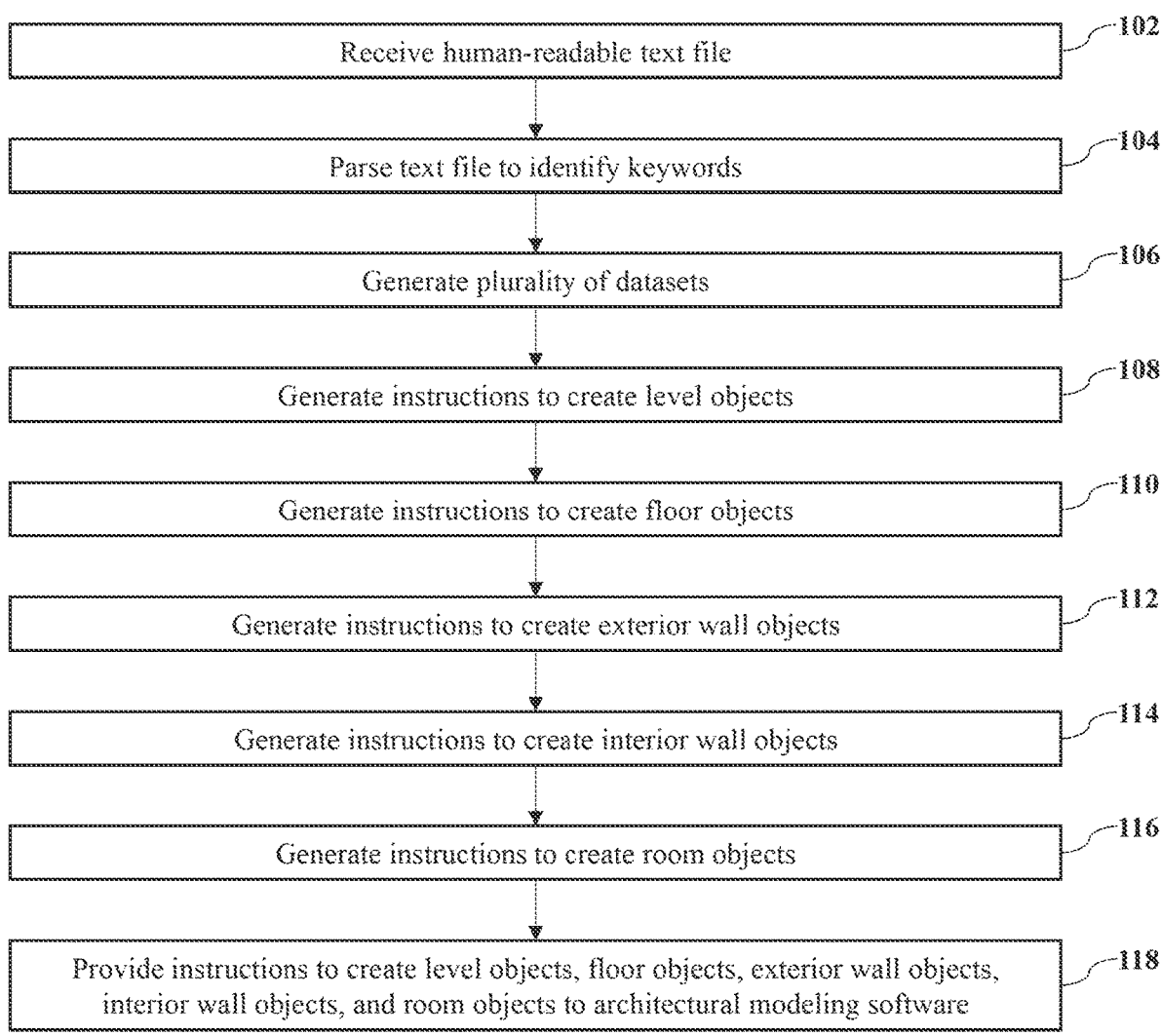
FIG. 1 is a flowchart illustrating a method according to an embodiment of the present invention.
Figure 10:
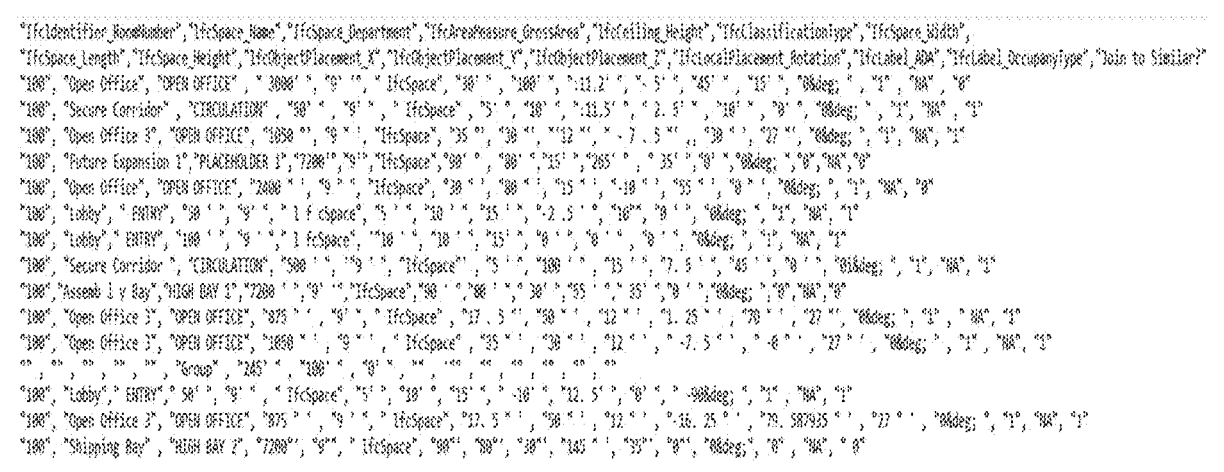

Referring now to FIG. 1, a method 100 of generating machine-readable instructions to automatically generate a three-dimensional architectural model is presented. The method 100 comprises the step of receiving a human-readable text file comprising a description of functional elements of a structure at block 102. As described above, this text file may be the output of a first architectural design software that is more conducive to the rapid drawing and/or design of an architectural model. For example, the SketchUp® 3D modeling software provides an example of software that utilizes simplified graphical user inputs to quickly develop an architectural model that may be exported as a human-readable file. Examples of human readable files include, but are not limited to, delimited text files such as comma-separated value (CSV) files, markup language files, including extensible markup language (XML) files and YAML files, and any other human-readable files as are known in the art. The data comprised by the human-readable text file may include information sufficient to define the features of the architectural design, including each room in the design. In some embodiments, the human-readable text may comprise a CSV file with some or all of the following for each room: a room elevation/ceiling height, a room area, a room width, a room length, a room height, a room description, an x-value location in an x-y-z grid, a y-value location in an x-y-z grid, a z-value location in an x-y-z grid, a material, a rotation, a room number, an entity name, a department, an ADA compliance indicator, an occupancy type, an indication whether to join the room to similar rooms, and a room classification type. The human-readable file may be structured to have a plurality of columns, with a header to define the value for each column, and each room of the design being on individual rows. An example of such a human-readable text file is shown in FIG. 10.

The method 100 may continue at block 104 with parsing the human-readable text file to identify keywords comprised by the text file, defining identified key words. In some embodiments, the identified keywords may be the headers of each column as described above. Furthermore, the identified keywords may be selected to associate common synonyms and interchangeable words for preferred keywords. For example, the identified keywords may comprise room names, geometric center points of the rooms, base room elevations, room areas, room lengths, room widths, room heights, descriptions, x-, y-, and z-value locations, materials, rotations, entity names, departments, ADA compliance indicators, occupancy types, indications whether to join to similar rooms, and classification types.

Figure 11:
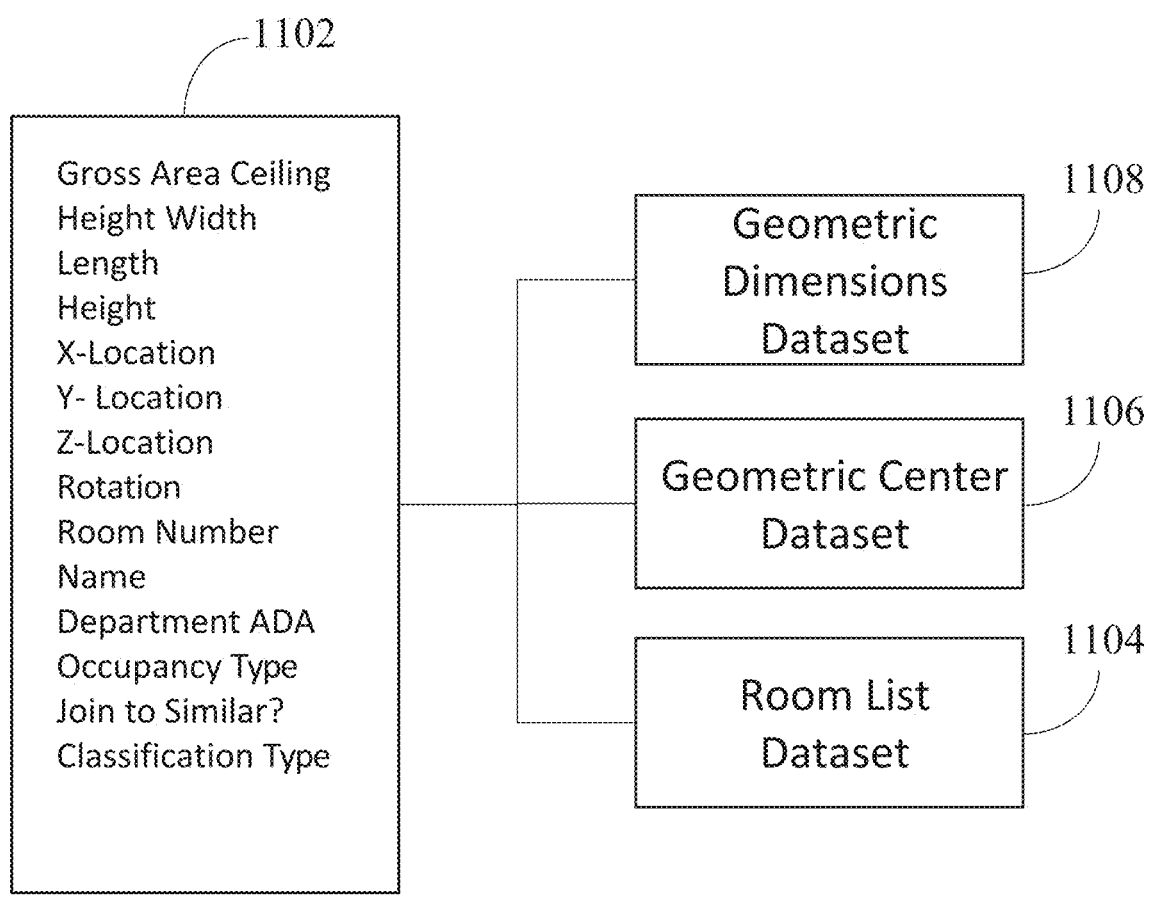
FIG. 11 is a schematic representation of the conversion of the keywords comprised by a human-readable text file into a plurality of datasets used in the generation of machine-readable instructions to generate a three-dimensional architectural model may be generated according to an embodiment of the invention.

The method 100 may continue at block 106 by generating a plurality of datasets responsive to the identified keywords, as seen in FIG. 11. The plurality of datasets 1104, 1106, 1108 may be lists of information that disaggregate the information comprised by the text file 1102 into discrete blocks of information that may facilitate that conversion of the text file 1102 into machine-readable instructions to generate an architectural model. The plurality of datasets may comprise a dataset comprising a list of the rooms to be comprised by the architectural model, a dataset comprising a list of the geometric center point for each room comprised by the architectural model, defining a center point list, and a dataset comprising the geometric dimensions for each room comprised by the architectural model, defining a dimensions list. In some embodiments, the geometric center point for each room may be provided in (X, Y, Z) coordinates. In some embodiments, the geometric dimensions of each room may be provided in (X, Y, Z) coordinates.

Figure 2:
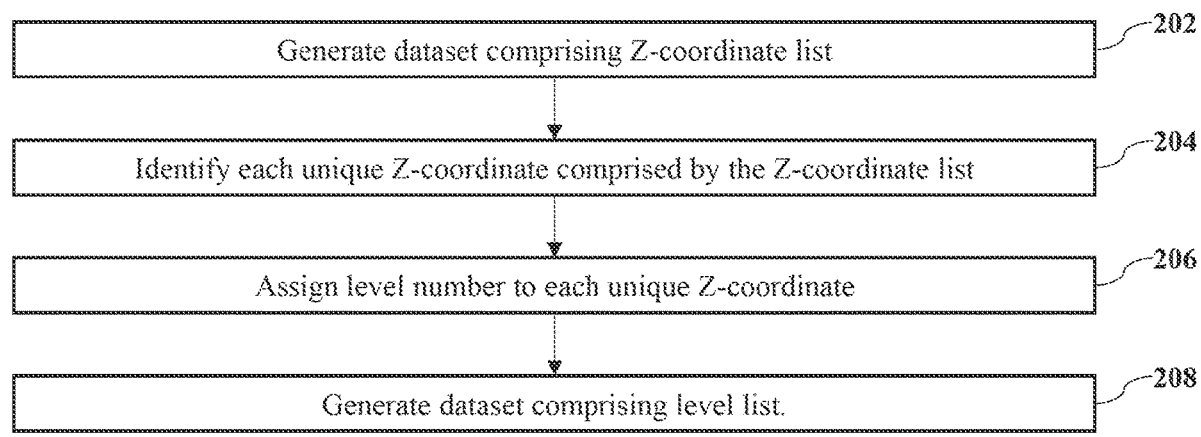
FIG. 2 is a flowchart illustrating a further method additional to FIG. 1 according to an embodiment of the invention.
Figure 12A:
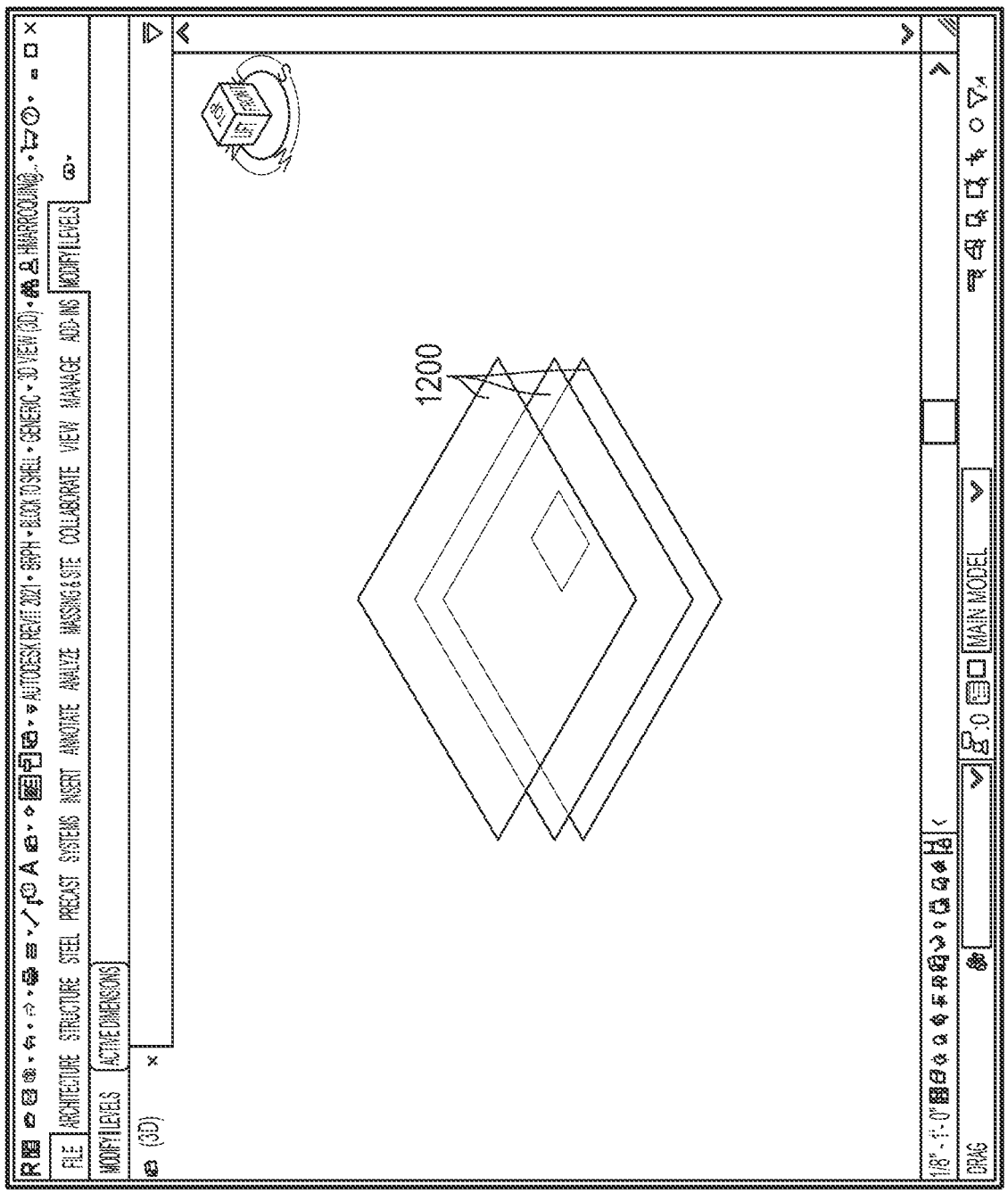
FIGS. 12A-24B are graphical representations of the methods depicted in FIGS. 1-9 and flow-based programming commands and results for generating the same according to embodiments of the invention.
Figure 12B:
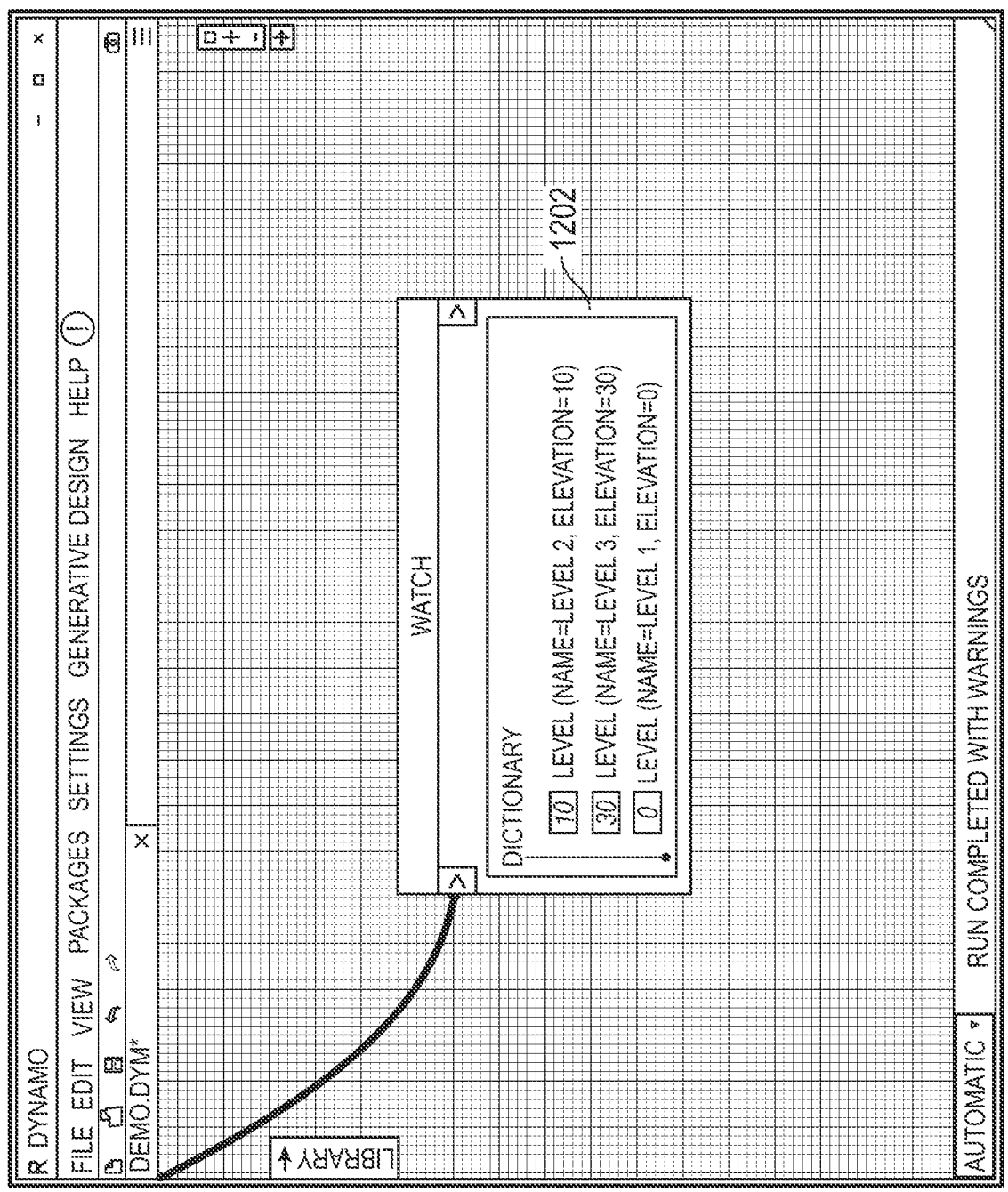

The method 100 may continue at block 108 by generating machine-readable instructions to create one or more level objects responsive to the plurality of datasets. A level object may be understood as a level or floor of the resulting architectural model (e.g. Level 1, Level 2, Level 3, etc.), with each room comprised by the final architectural model being associated with one or more of the level objects. Referring now additionally to FIG. 2, a method 200 of generating machine-readable instructions to create on or more level objects is presented. The method 200 may comprise generating a dataset comprising a list of the Z-coordinates for each room, defining a Z-coordinate list, at block 202. The Z-coordinate for each room may be located in the center point list comprised by the geometric center dataset 1106 of FIG. 11. The method 200 may continue at block 204 with identifying each unique Z-coordinate comprised by the Z-coordinate list. For example, where there are multiple instances of the same Z-coordinate in the Z-coordinate list, only one of those instances will be identified and the rest will be disregarded. The method 200 may continue at block 206 with assigning a level number to each unique Z-coordinate. For example, the unique Z-coordinate with the lowest value may be assigned Level 1, the unique Z-coordinate with the next greater value may be assigned Level 2, etc. It is contemplated and included within the scope of the invention that any level naming nomenclature may be utilized and that the unique Z-coordinates may be assigned level names by any pattern or non-patterned assignment as may be known in the art, including lowest to greatest, greatest to lowest, expanding from a center point, looping from bottom to top and/or top to bottom, and the like. The method 200 may continue at block 208 with generating a dataset comprising a list of the level numbers, defining a level list. A graphical representation of a plurality of level objects 1200 generated by the method 200 is shown in FIG. 12A, and a level list 1202 is shown in FIG. 12B.

Figure 3:
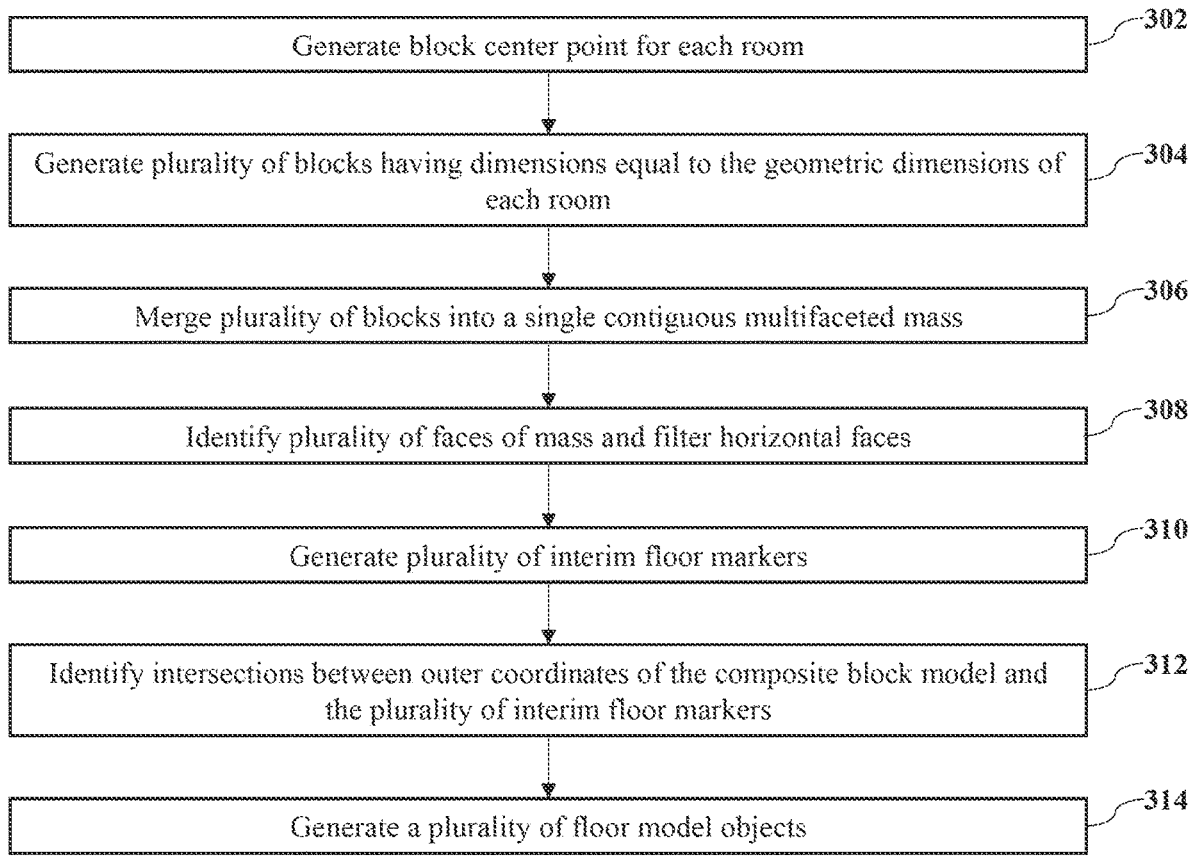
FIG. 3 is a flowchart illustrating a further method additional to FIG. 2 according to an embodiment of the invention.
Figure 13A:
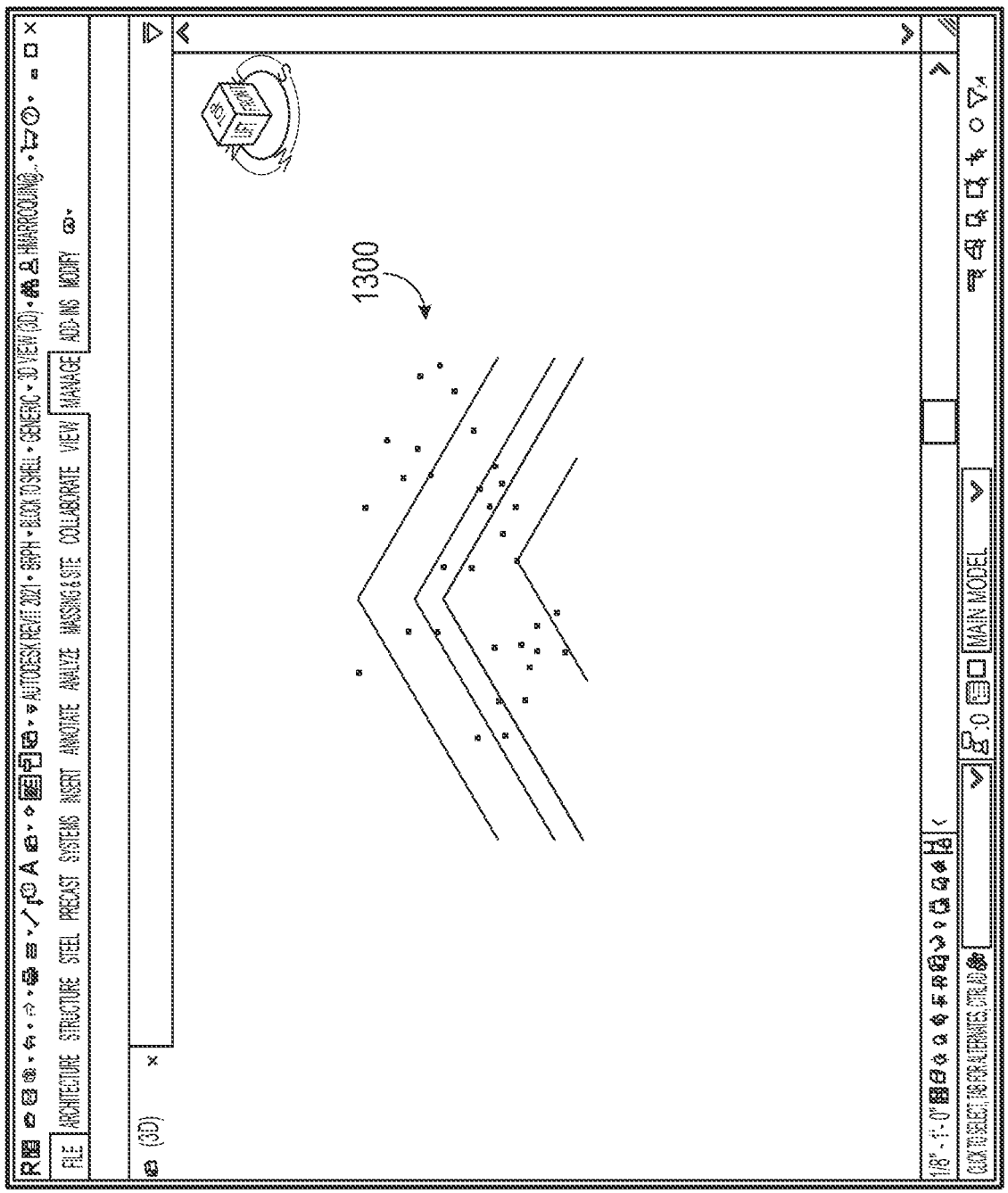
Figure 13B:
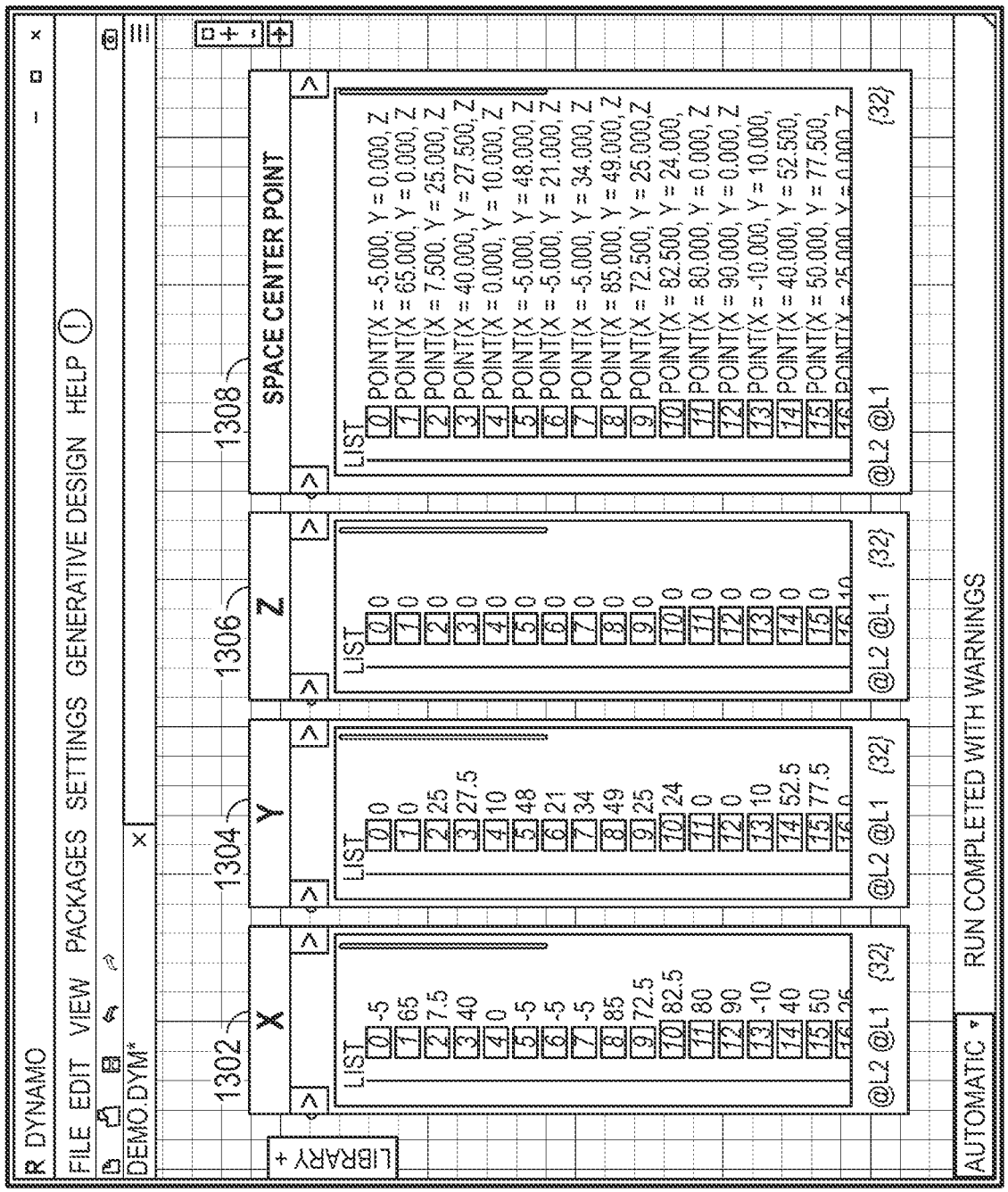

Referring now back to FIG. 1, the method 100 may continue at block 110 with generating machine-readable instructions to create one or more floor objects responsive to the plurality of datasets and the one or more level objects. A floor object may be understood as the floor for the rooms of the architectural model. Referring now additionally to FIG. 3, a method 300 of generating machine-readable instructions to create one or more floor objects is presented. The method 300 may comprise within it a method of generating a composite block model. The blocks generated by this method may be representative of the rooms comprised by the architectural model. A composite block model may be understood as a contiguous model of the blocks/rooms comprised by the architectural model without interior features, i.e. is a solid block defined by a plurality of exterior faces. The method 300 may start at block 302 with generating a block center point at the geometric center point for each room, resulting in a plurality of block center points. The block center point that is generated by this operation may be given in (X, Y, Z) coordinates. The blocks generated by this step may be representative of the rooms comprised by the architectural model. The center points for each block may be identified based on the geometric center point for each room comprised by the geometric center dataset 1106 shown in FIG. 11. FIG. 13A depicts a plurality of center points 1300 and FIG. 13B depicts the X-coordinates 1302, Y-coordinates 1304, and Z-coordinates 1306 as retrieved from the geometric center dataset 1106 and the plurality of center points 1308 when the X-, Y-, and Z-coordinates are combined to generate the plurality of center points 1308.

Figure 14A:
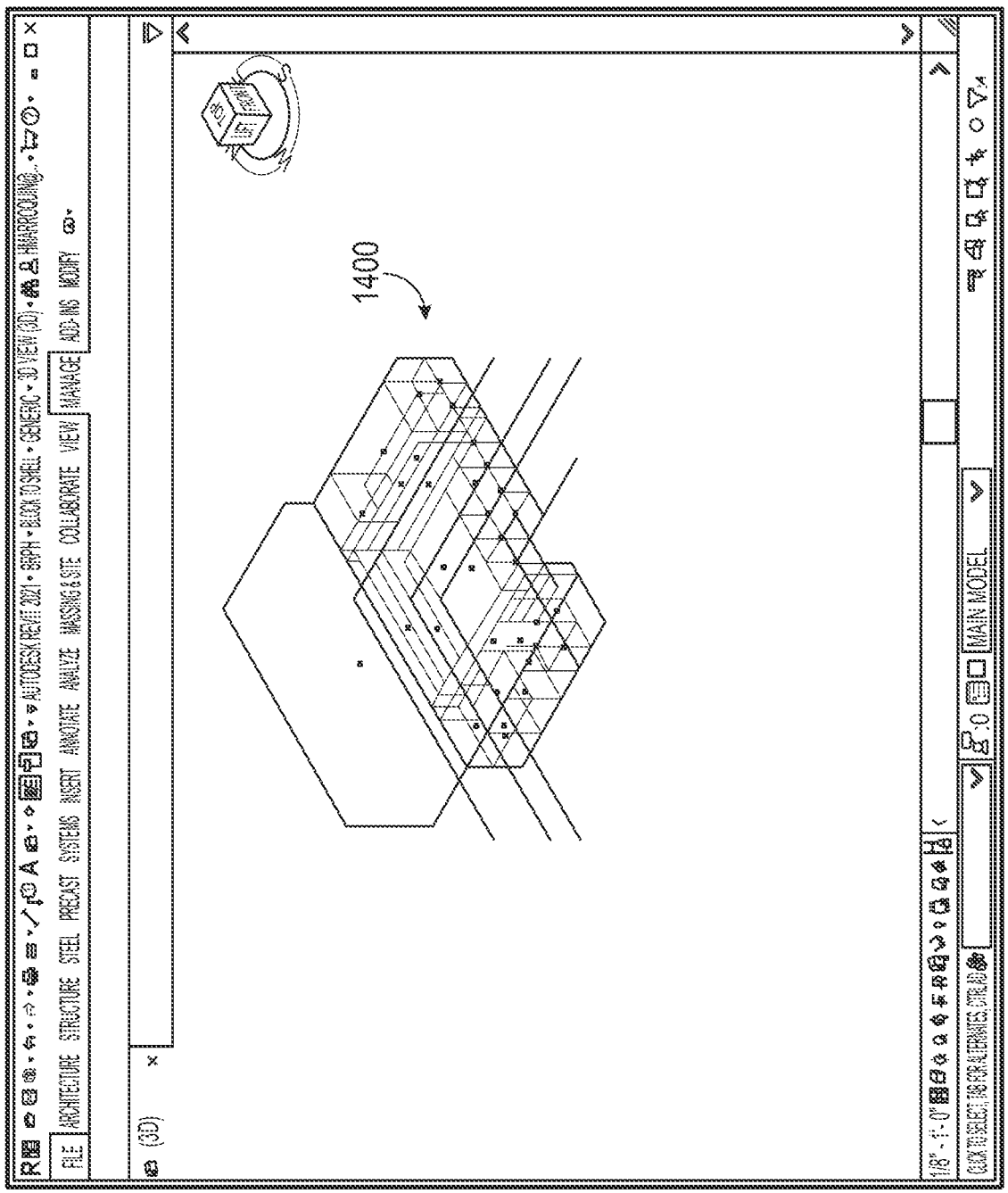
Figure 14B:
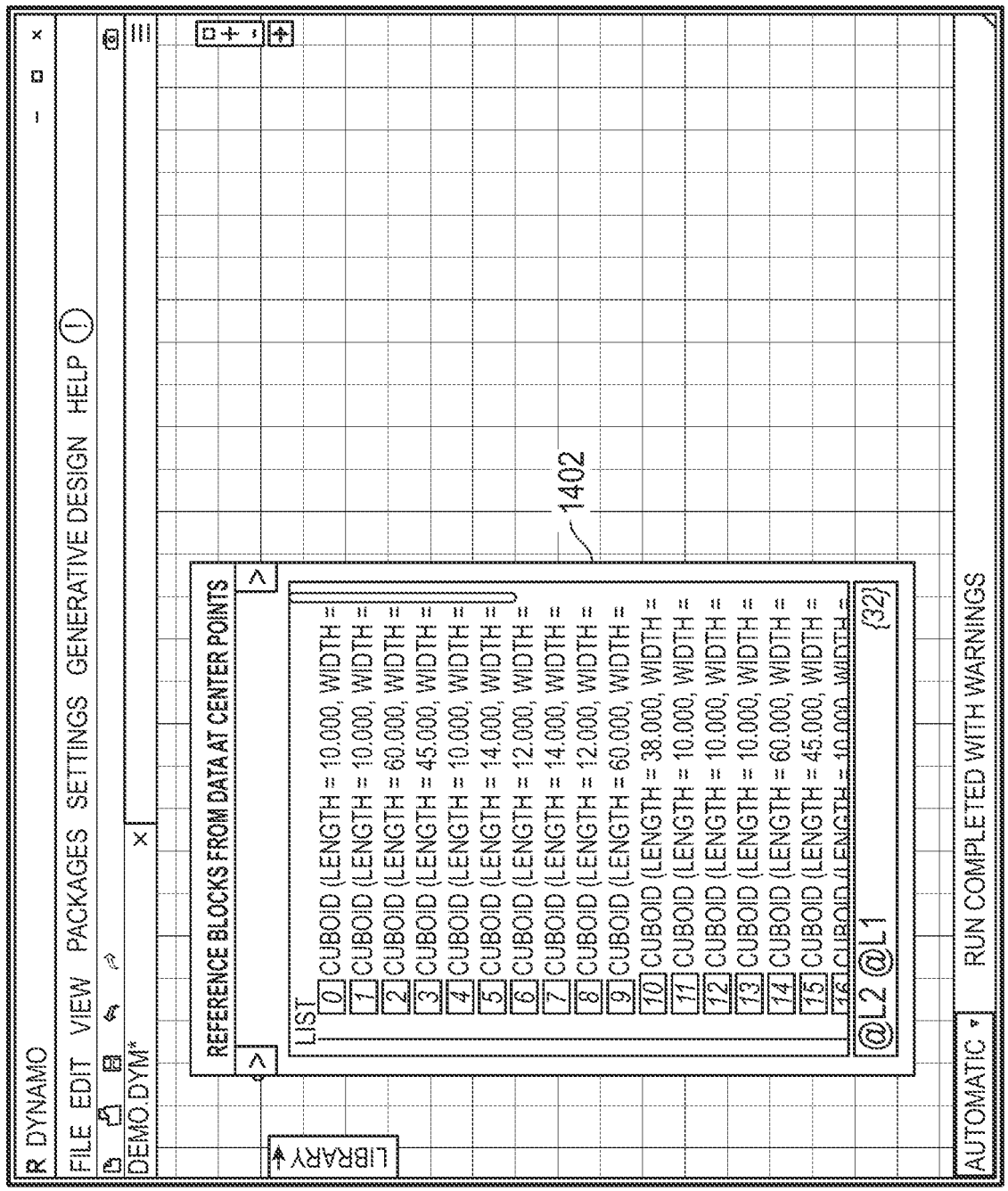

The method 300 may continue at block 304 with generating a block having dimensions equal to the geometric dimensions of each room comprised by the architectural model, each block that is generated being centered at the block center point for that block, resulting in a plurality of blocks. The dimensions for each block may be comprised by the geometric dimensions dataset 1108 shown in FIG. 11. FIG. 14A depicts a plurality of blocks 1400 generated by this method having center points at the center points 1300 depicted in FIG. 13A, and FIG. 14B depicts the list of dimensions 1402 retrieved from the geometric dimensions dataset 1108.

Figure 15A:
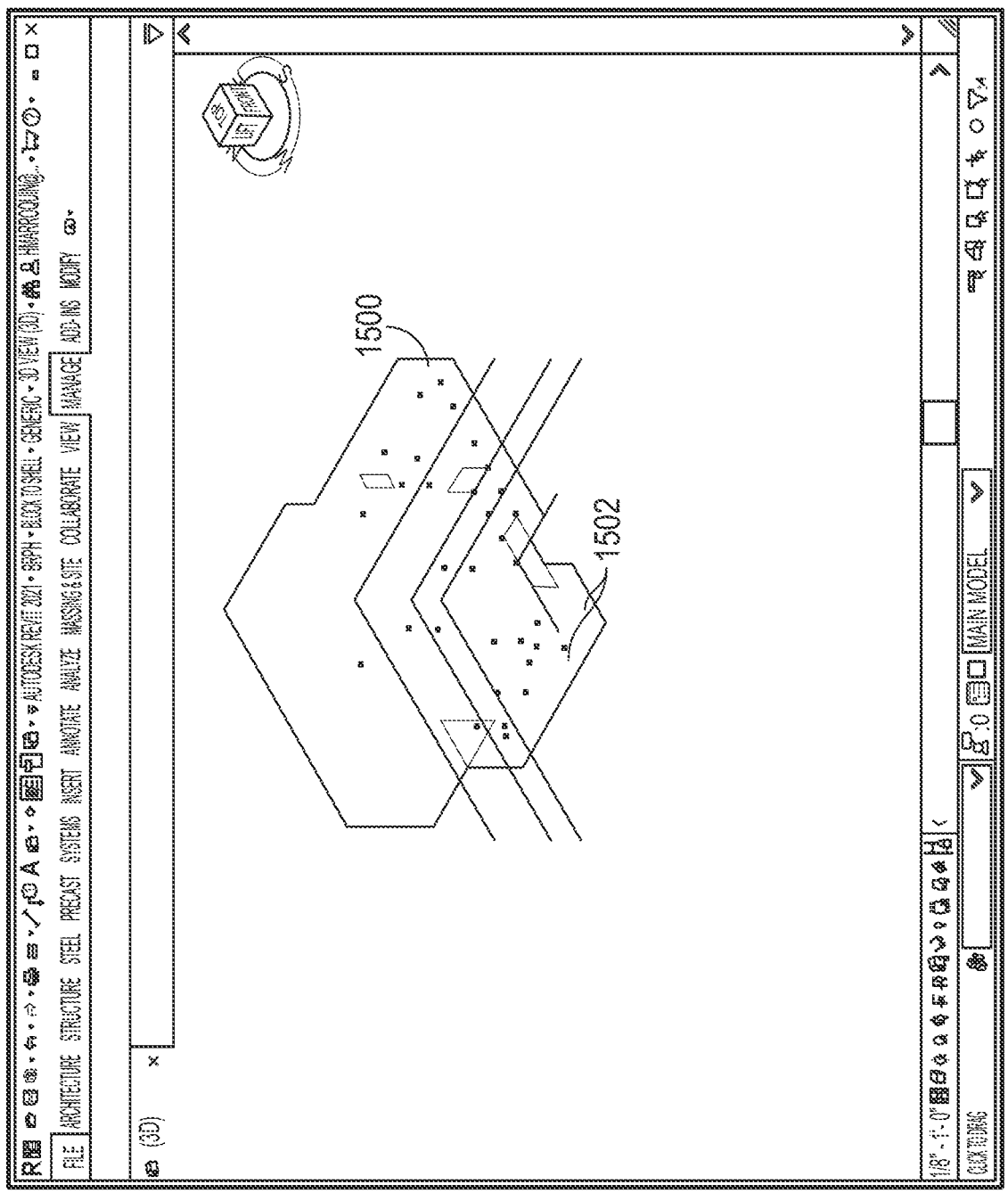
Figure 15B:
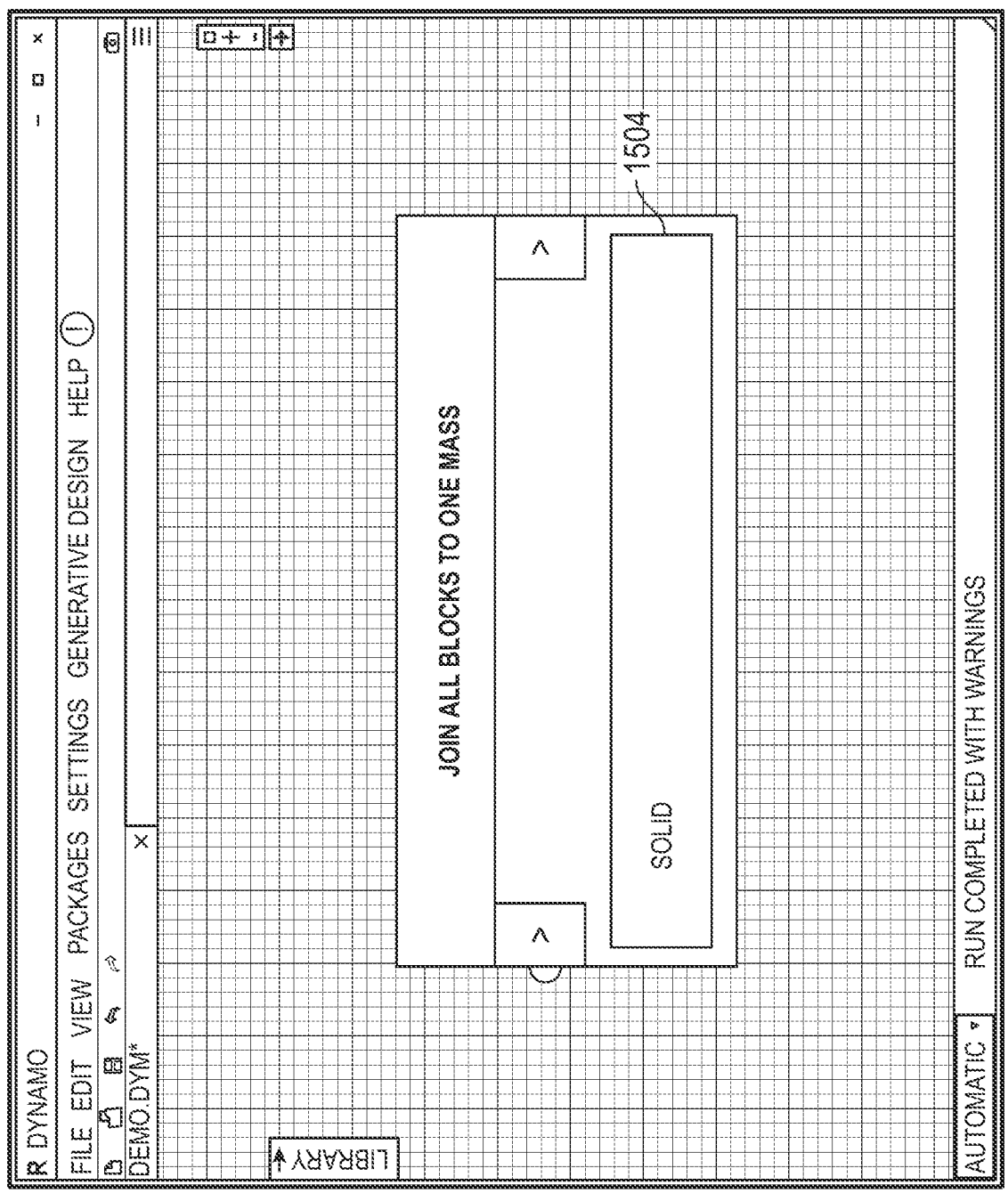

The method 300 may continue at block 306 with merging the plurality of blocks into a single contiguous multifaceted mass, defining the composite block model. As shown in FIG. 15A, the plurality of blocks 1400 depicted in FIG. 14A have been joined as a single contiguous mass 1500, with their internal features having been integrated and removed, but the exterior faces defining a plurality of facets 1502 of the mass 1500. FIG. 15B depicts a command 1504 to join the plurality of blocks/cuboids 1400 shown in FIG. 14B into the single contiguous mass 1500. Performance of this step may complete the generation of the composite block model.

Figure 16A:
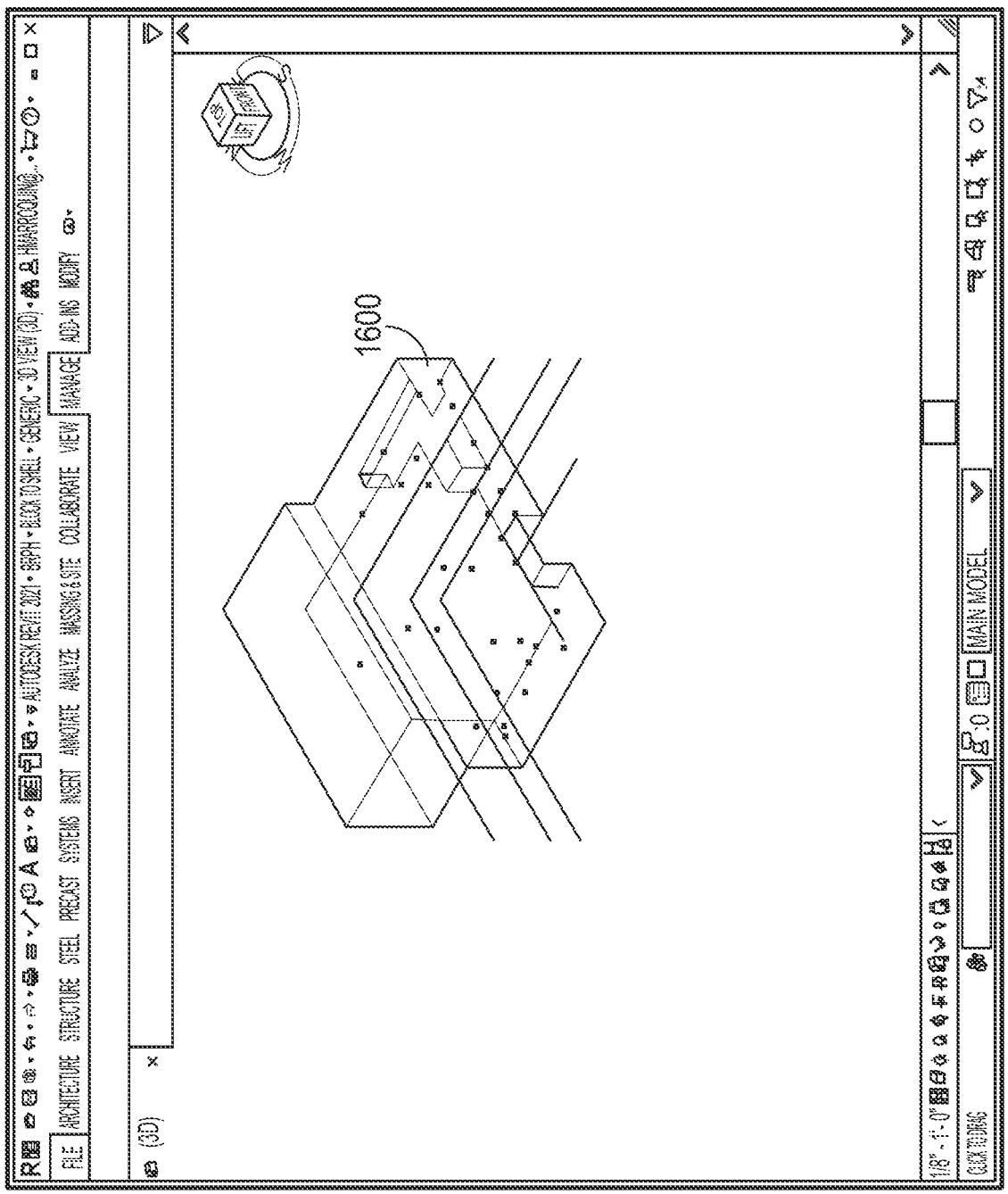
Figure 16B:
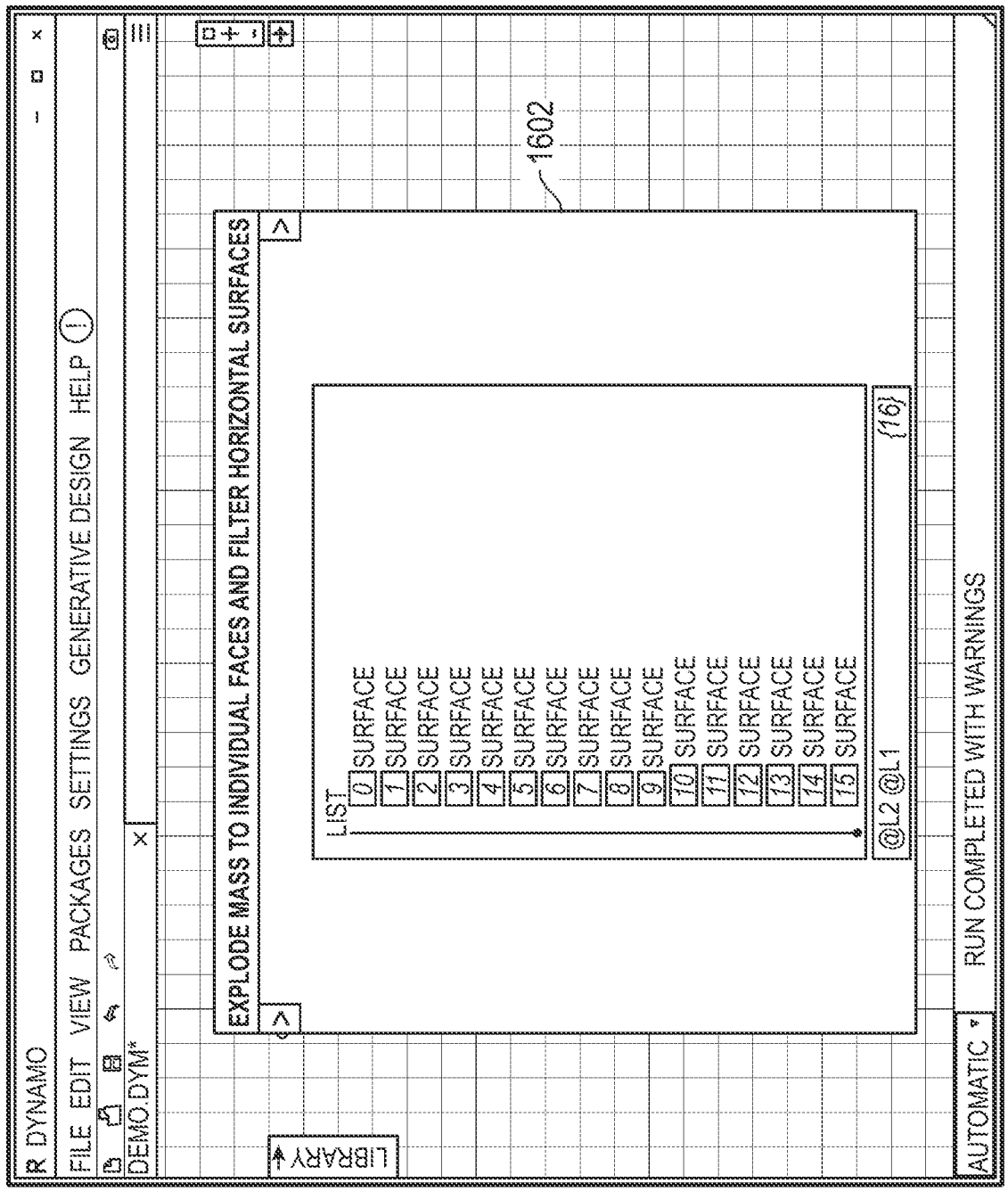

The method 300 may continue with generating a maximum dimension block model. The maximum dimension block model may be understood as a block model positioned such that its outer dimensions are coextensive with the maximum and minimum (X, Y) coordinates of the composite block model. Generating a maximum block model may comprise deconstructing the single contiguous mass to its plurality of faces and filtering the horizontal faces, such that only vertical and skew faces remain, as shown at block 308. Deconstructing the single contiguous mass may comprise utilizing a function that identifies faces comprised by the contiguous mass, thereby identifying each faces of the mass. The horizontal faces, i.e. those that have a single Z-value at all points, may then be removed from the list of faces identified. FIG. 16A depicts the contiguous mass 1500 of FIG. 15A with the horizontal faces removed such that a plurality of exterior, vertically-aligned faces defining the maximum dimension block model 1600 remain. FIG. 16B depicts the function 1602 to identify the plurality of faces.

Figure 17A:
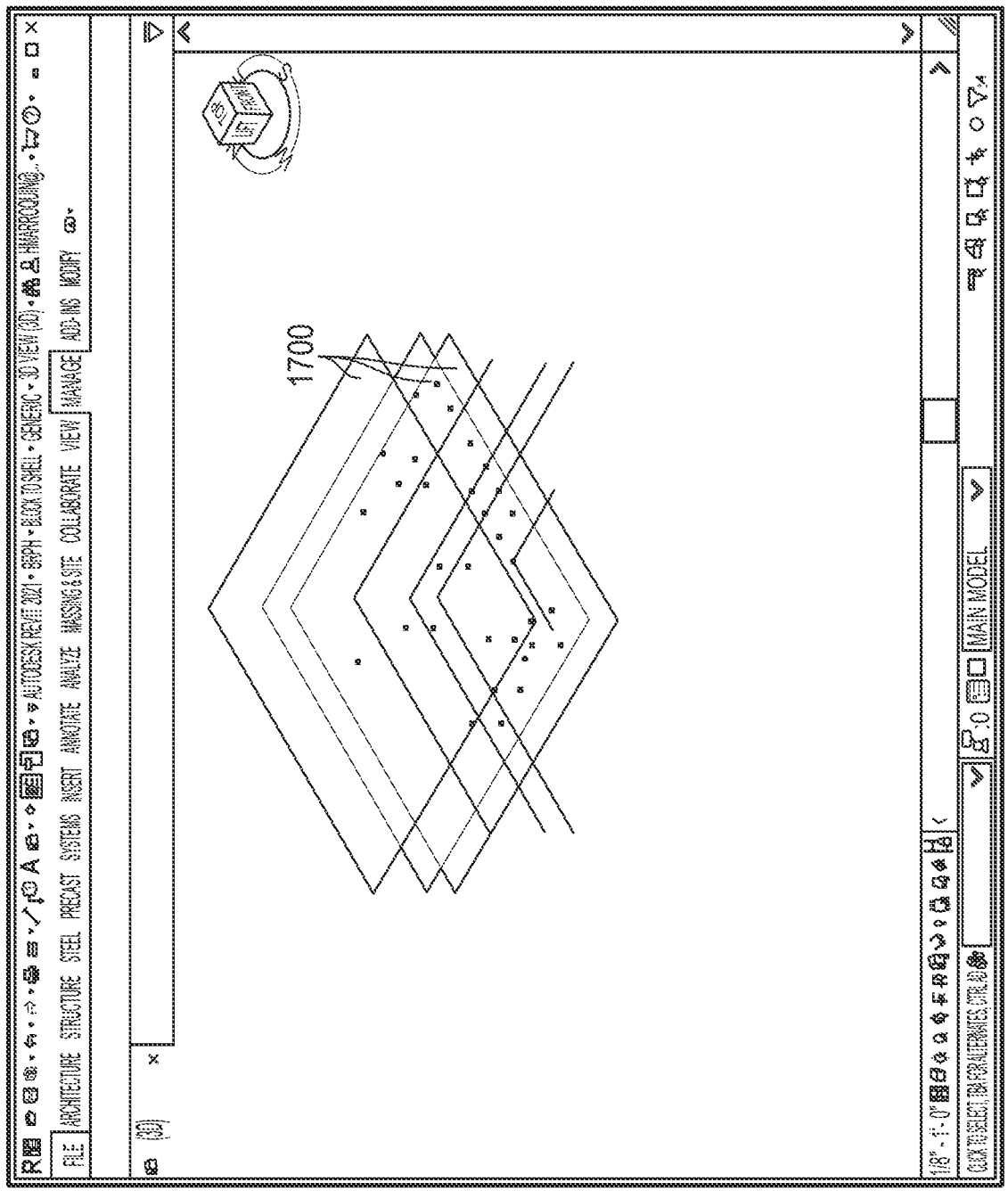
Figure 17B:
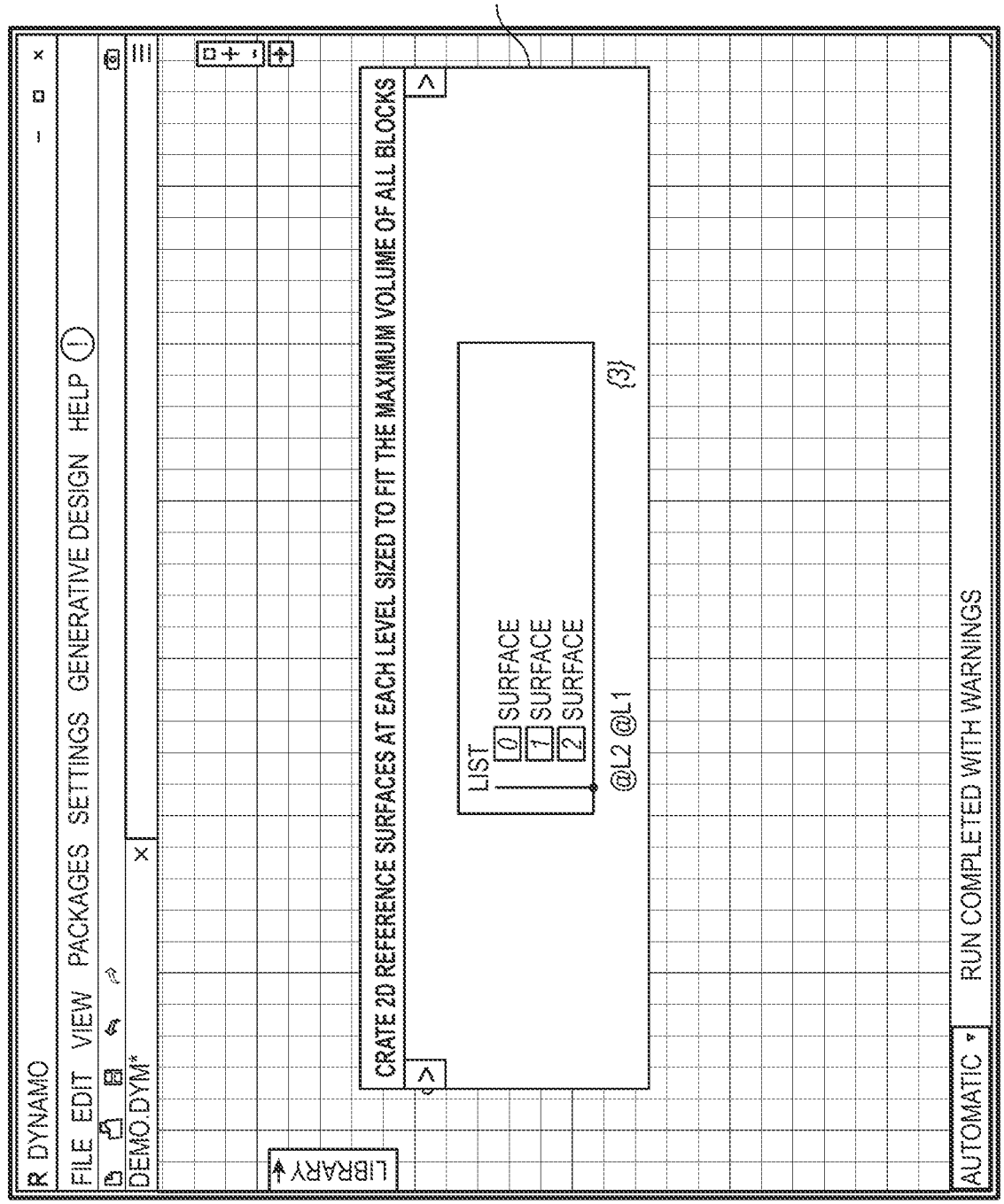

The method 300 may continue at block 310 with generating a plurality of interim floor markers. The interim floor markers may be geometric figures having (X, Y) dimensions that are coextensive with the (X, Y) dimensions of the maximum block model. In the present embodiment, the interim floor markers may be rectangular, but any regular or non-regular shape as is known in the art is contemplated. Each interim floor marker may have a Z value equal to a Z value of a level object that was previously created. There may be the same number of interim floor markers created as there are level objects, such that each level object has an interim floor marker associated with it. In some embodiments, the interim floor markers may be dimensioned so as to be coextensive with the outer dimensions of the maximum block model on all floors. In some embodiments, the interim floor markers may be dimensioned so as to be coextensive with the outer dimensions of the portion of the maximum block model having a Z value equal to the Z value of a level object. FIG. 17A depicts a plurality of interim floor markers 1700 and FIG. 17B depicts the command 1702 to create the plurality of interim floor markers 1700.

Figure 18A:
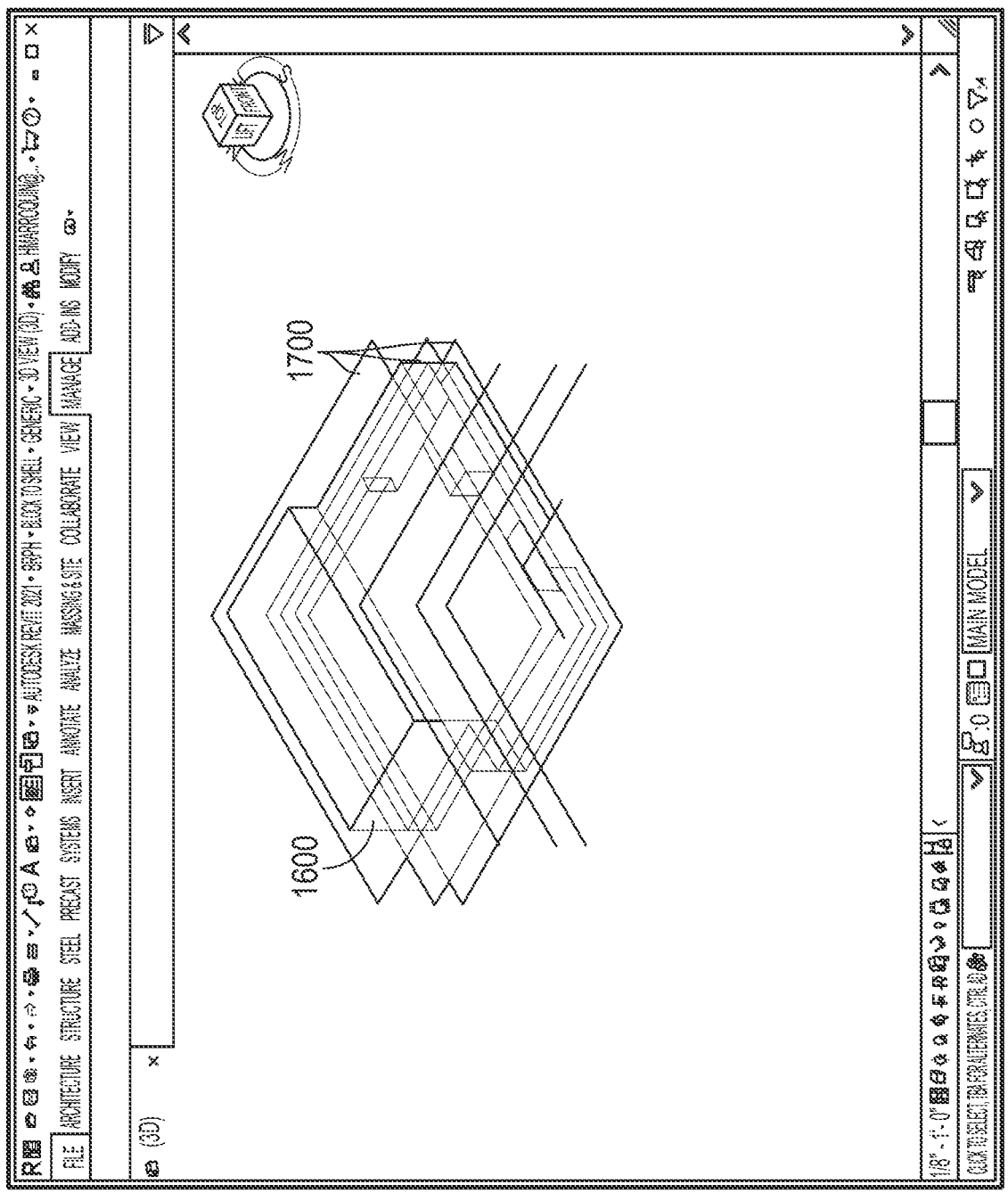

The method 300 may continue at block 312 with identifying intersections between the maximum dimension block model and the plurality of interim floor markers, defining interim floor marker intersections. As shown in FIG. 18A, the plurality of interim floor markers 1700 can be displayed along with the maximum dimension block model 1600, and the intersections there between are identified. The intersections serve to identify the outer perimeter/boundary of the floors of each level, with the area of the interim floor markers bounded thereby defining the floors for each level. The interim floor marker intersections may define a closed shape at each interim floor marker. The intersections may be defined as a plurality of lines/curves, as shown by the command 1802 in FIG. 18B.

Figure 18B:
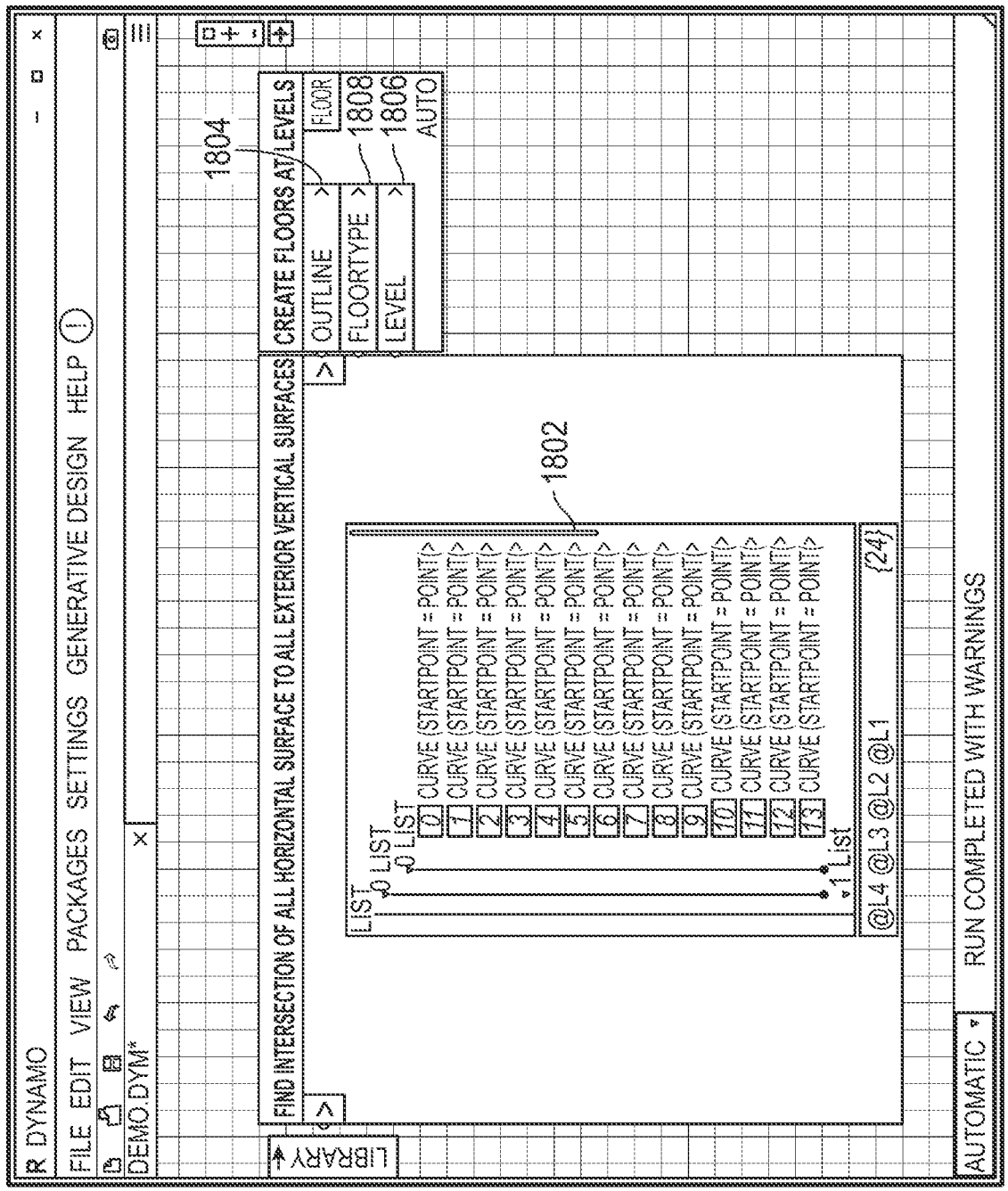
Figure 18C:
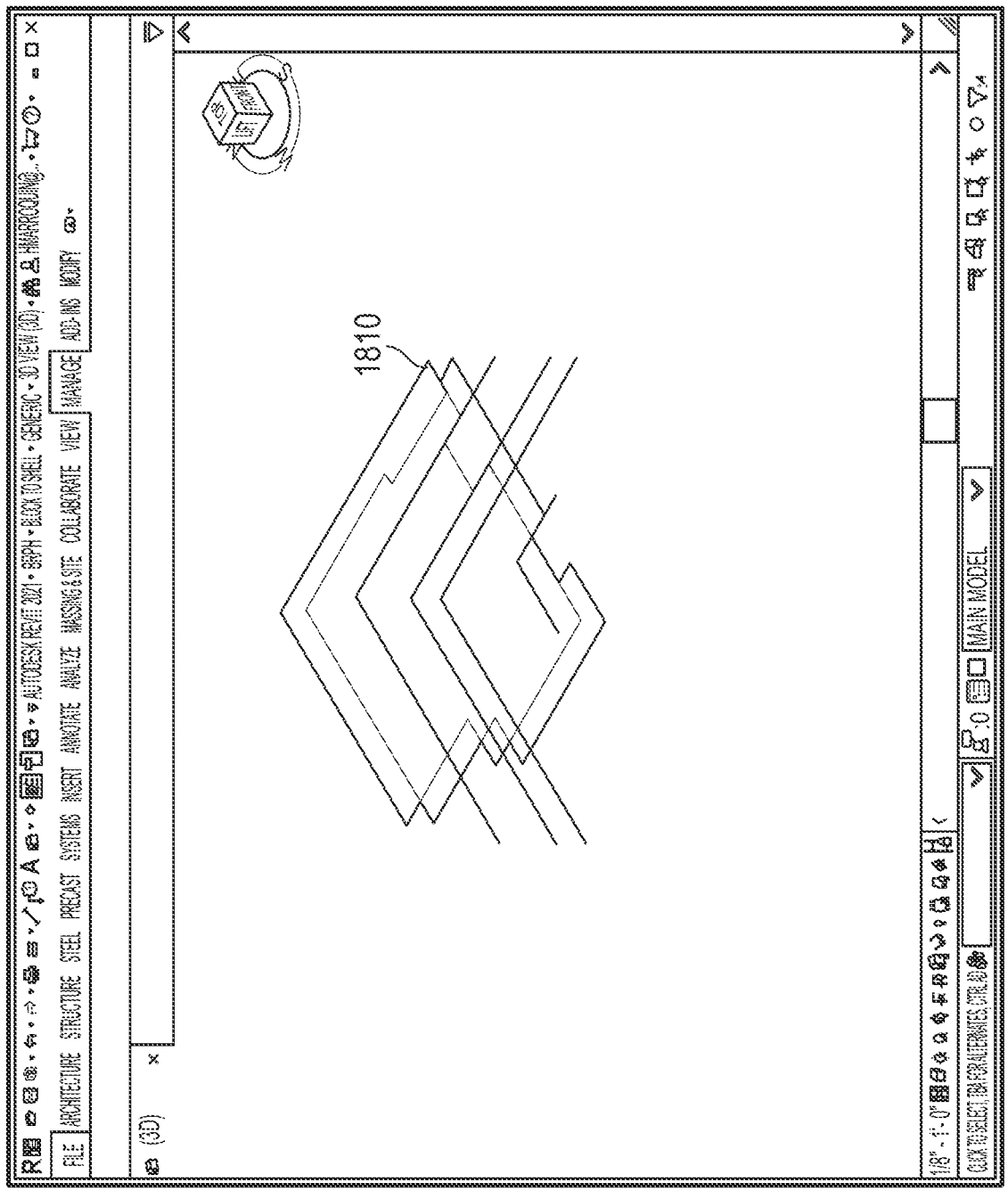

The method 300 may finish at block 314 with generating a plurality of floor model objects, each floor model object having a Z value equal to the Z value for one of the plurality of interim floor markers and a boundary defined by the interim floor marker intersections. In some embodiments, the Z value may be defined by the user providing an input to select the level 1806 to which the floor model object is associated. The floor model objects may be architectural objects comprised by the architectural model. As suggested, each floor model object may have a defined Z value to define its elevation within the model and a perimeter defined by the interim floor marker intersections. The area bounded by the interim floor marker intersections at the Z value for each interim floor marker may be understood as the area for each floor model object. Accordingly, there will be a floor model object for each level comprised by the architectural model. As shown in FIG. 18B, the "outline" 1804 may be the plurality of lines/curves defining the interim floor marker intersections. In some embodiments, the user may select a floor type/material 1808. A graphical representation of completed floor objects 1810 is shown in FIG. 18C.

Figure 4:
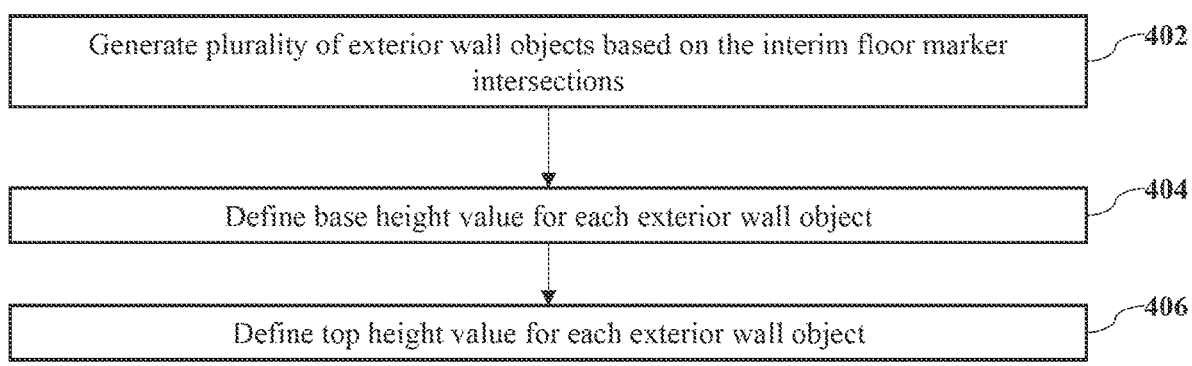
FIG. 4 is a flowchart illustrating a further method additional to FIG. 3 according to an embodiment of the invention.

Referring now back to FIG. 1, the method 100 may continue at block 112 with generating machine-readable instructions to create a plurality of exterior wall objects responsive to the plurality of datasets and the one or more level objects. Referring additionally to FIG. 4, a method 400 of generating a plurality of exterior wall objects is presented. The method 400 may start at block 402 with generating a plurality of exterior wall objects based on the interim floor marker intersections. These may be the same interim floor marker intersections generated in FIG. 3. The exterior wall objects, at this stage of creation, may be similar to the floor model objects as they may include a plurality of lines/curves, as shown at 1902 in FIG. 19B.

The method 400 may continue at block 404 with defining a base height value for each exterior wall object, the base height value being equal to the Z value for the level object associated with each exterior wall. Accordingly, the base height value may also, or, alternatively have a Z value equal to the interim floor marker associated with the interim floor marker intersections the exterior wall object is associated with, and/or the floor model object also associated with the interim floor marker/marker intersection. The base height value is shown at 1904 in FIG. 19B.

Figure 19A:
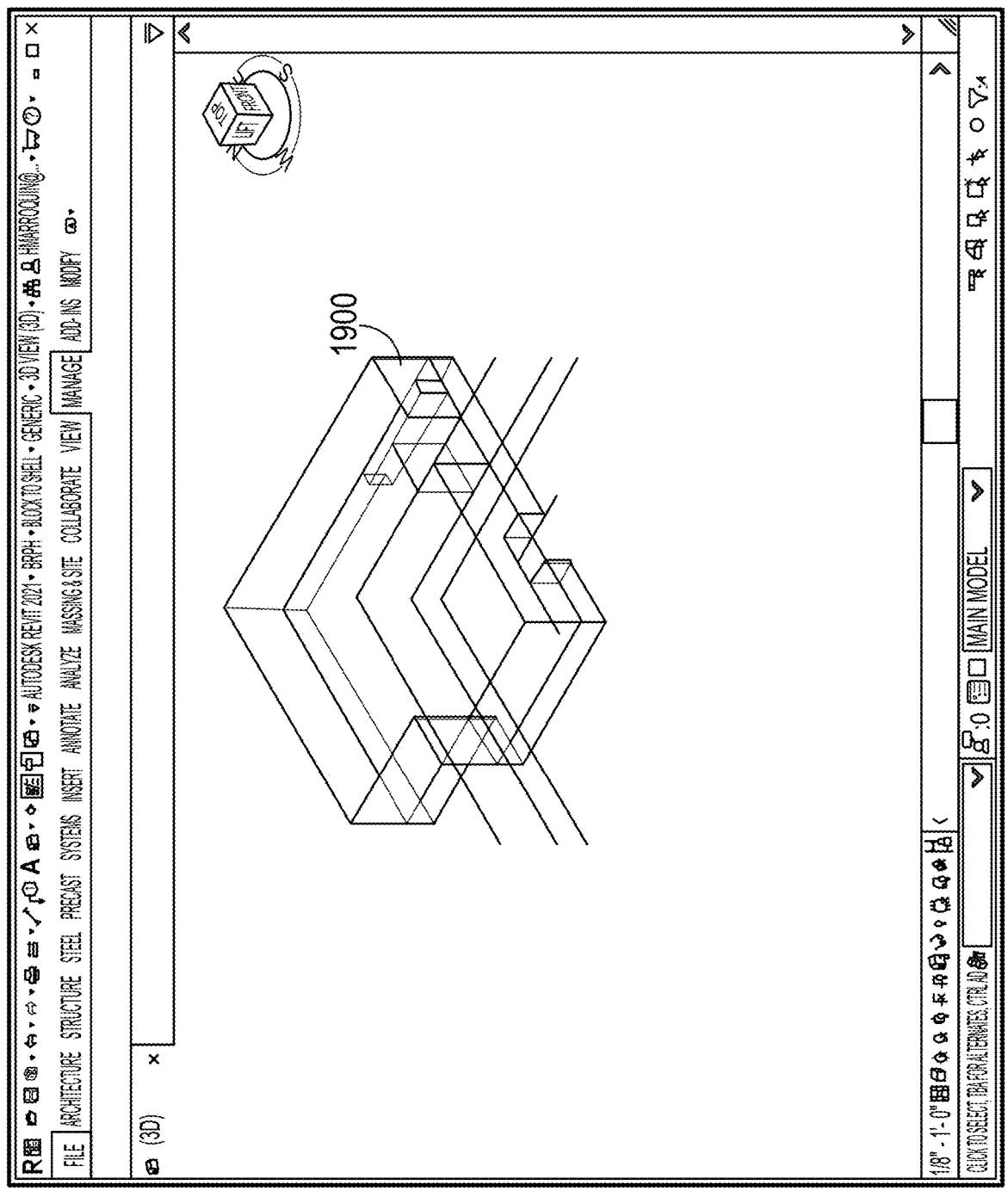
Figure 19B:
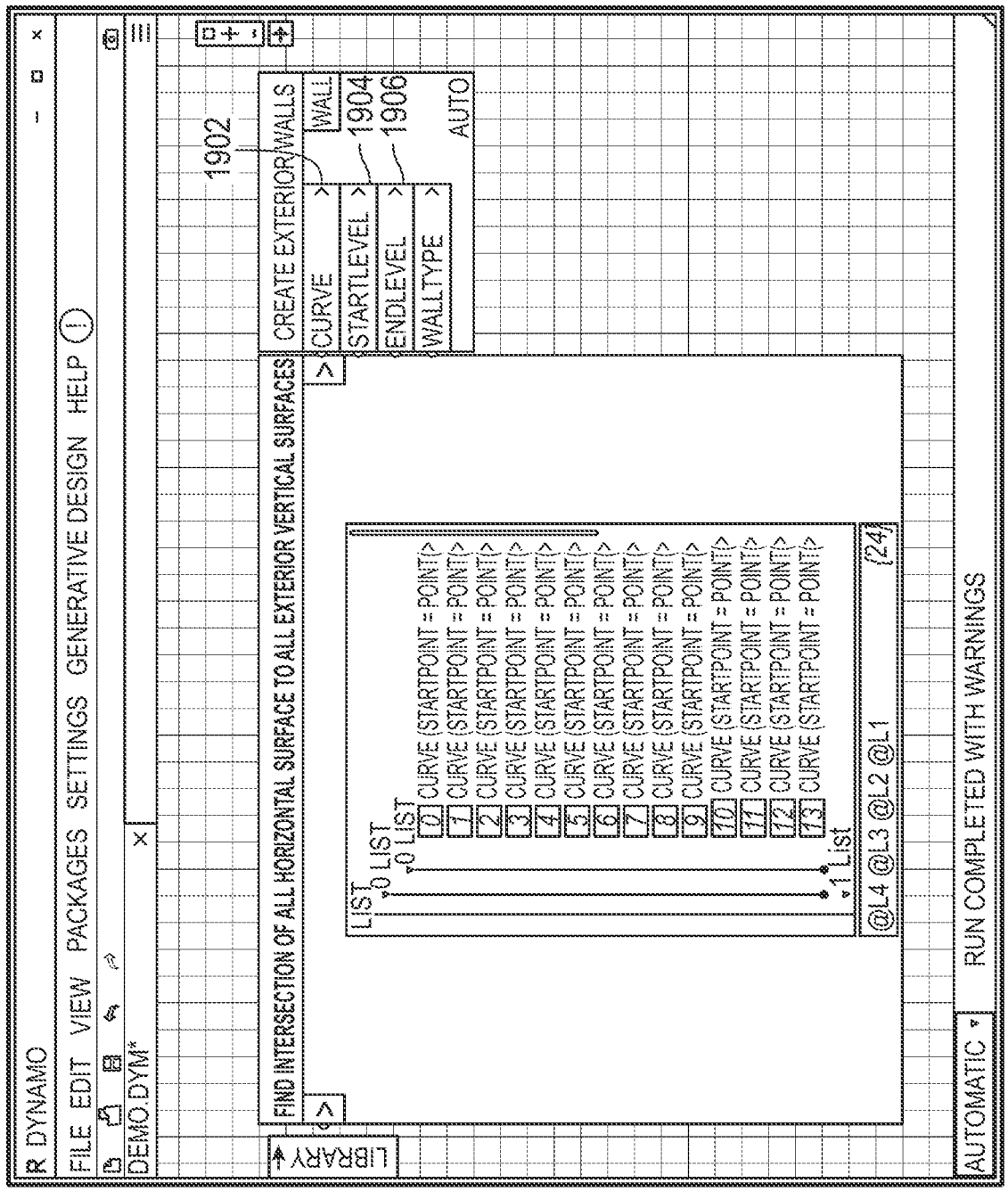
Figure 20A:
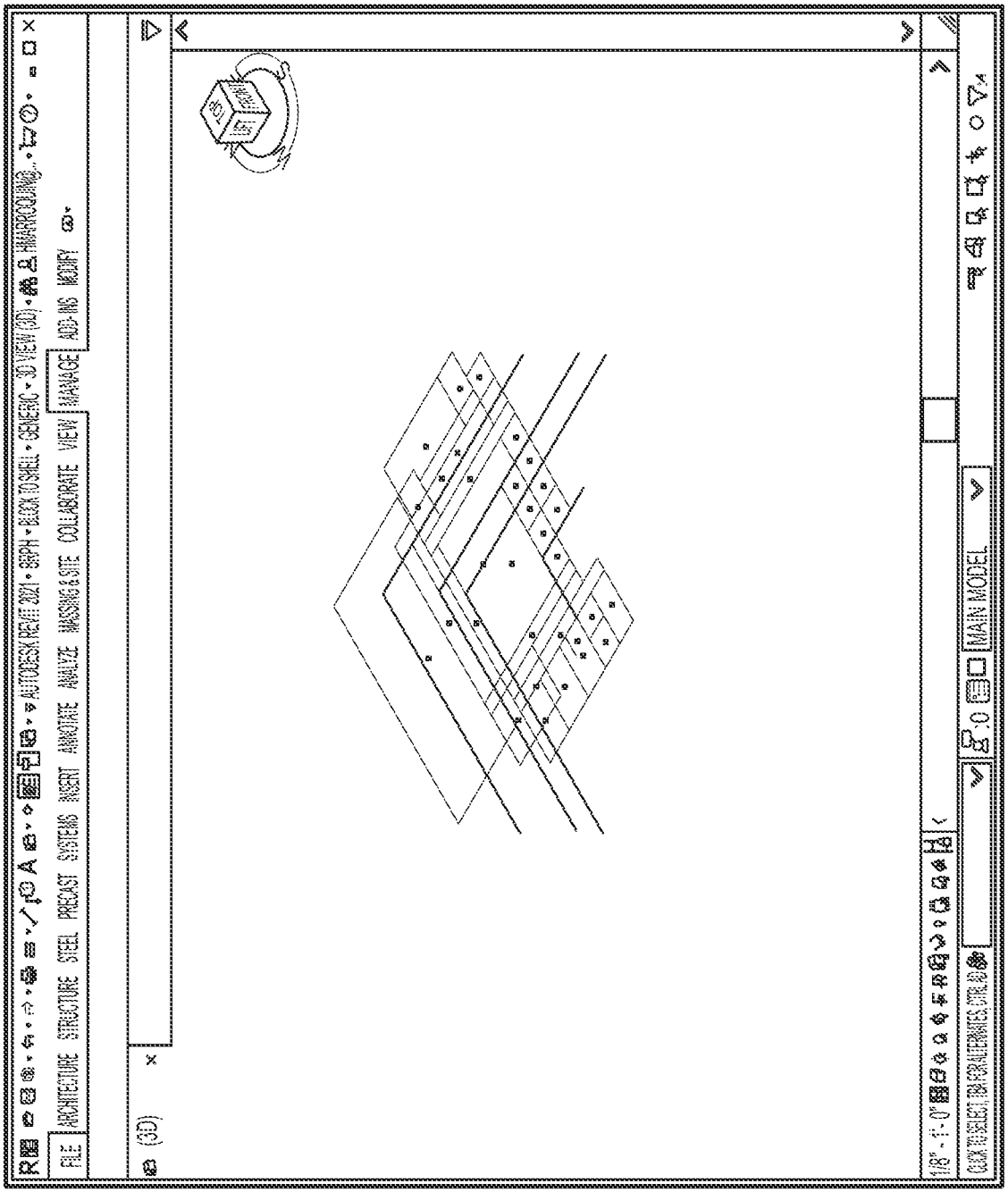
Figure 21A:
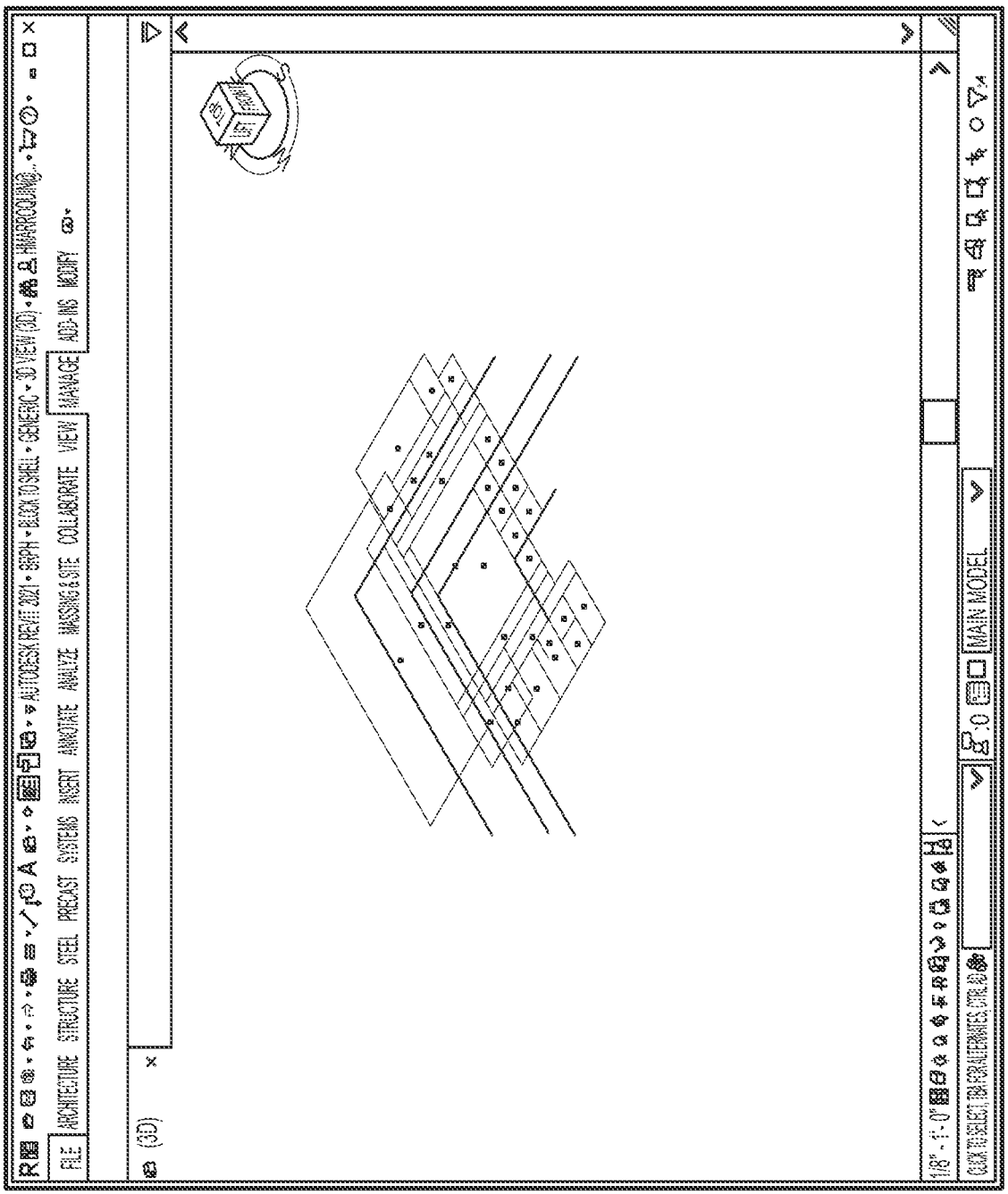
Figure 21B:
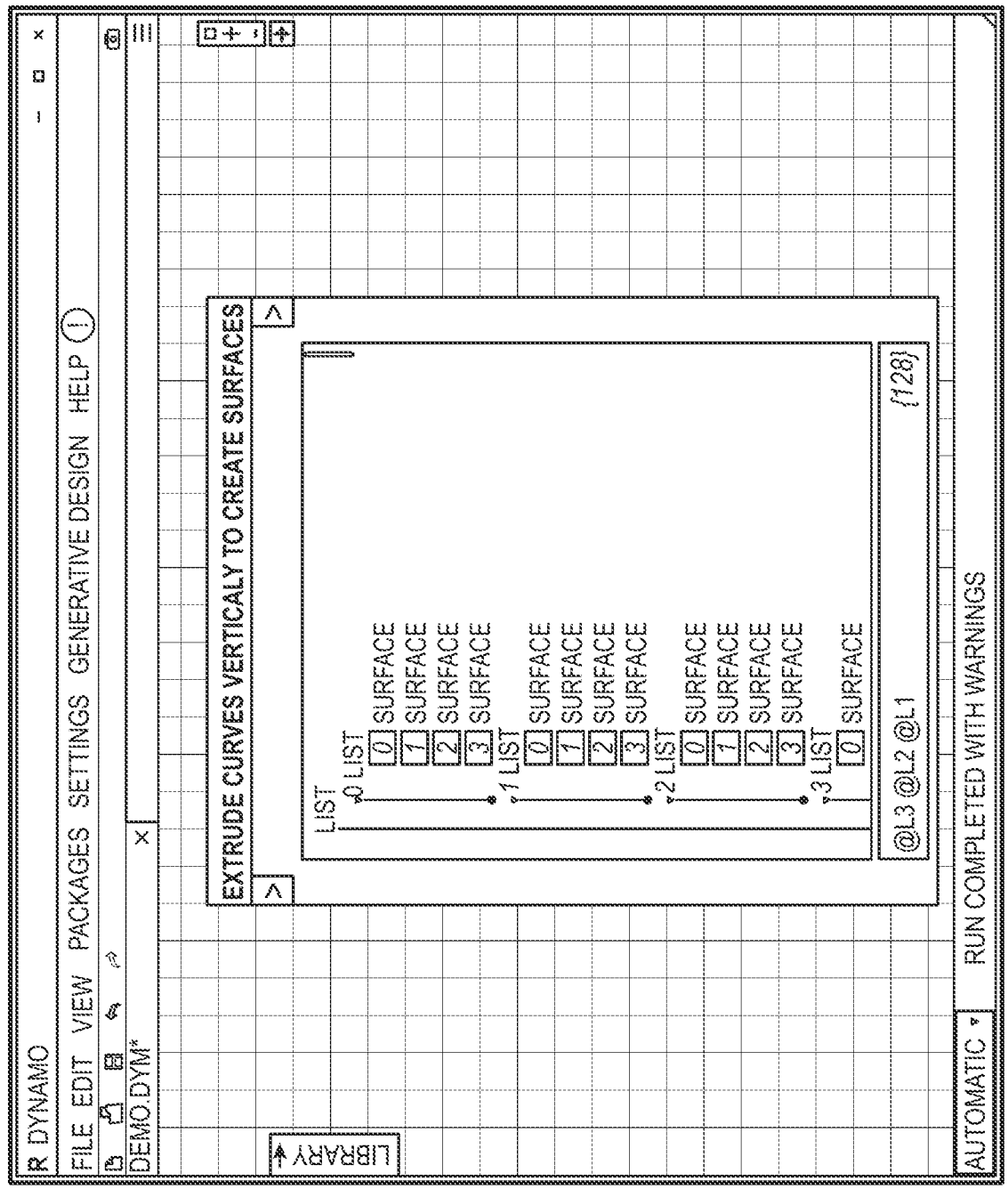

The method 400 may continue at block 406 with defining a top height value for each exterior wall object, the top height value being equal to the Z value for the level object having a level number that is the next greater level number than the level number of the level object associated with the exterior wall. In essence, the top height value may be the Z value for the next level object "up," i.e. having a greater Z value than the level object associated with the exterior wall object. Where the exterior wall object is for the top level, and no level object exists above it, then the top height value may be one of a building height value, a roof value, a maximum interior height value, or something of the like. In some embodiments, the top height value may be pre-defined for the architectural model as being a defined value greater than the base height value. In some embodiments, the top height value may be received from a user as a user input. The top height value is shown at 1906 in FIG. 19B. Moreover, a plurality of exterior wall objects 1900 having the lines/curves, base height value, and top height value defined is shown in FIG. 19A. As can be seen in the graphical representation, the plurality of exterior wall objects 1900 have differing perimeters based on their level.

Figure 5:
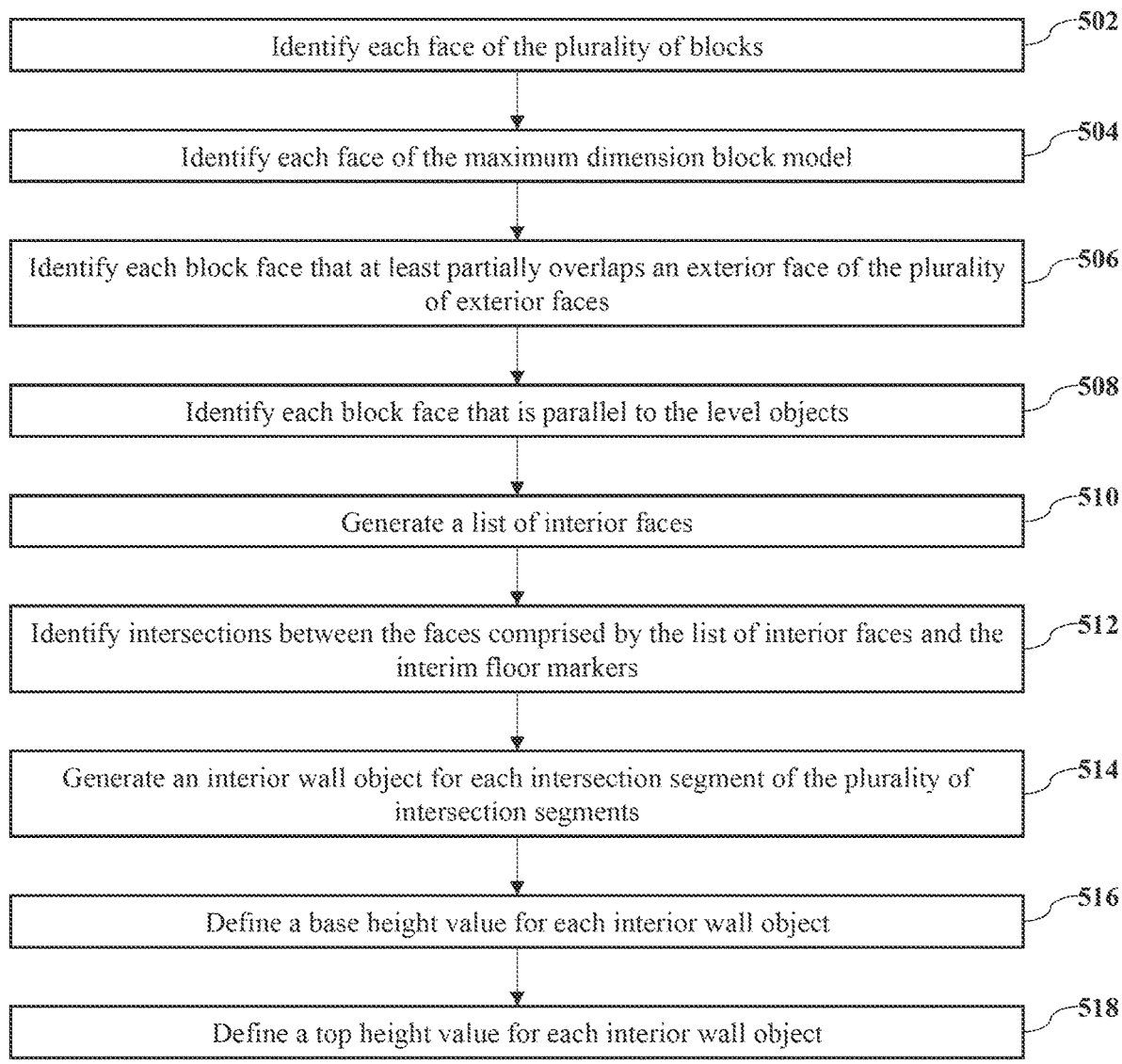
FIG. 5 is a flowchart illustrating a further method additional to FIG. 4 according to an embodiment of the invention.

Referring now back to FIG. 1, the method 100 may continue at block 114 with generating machine-readable instructions to create a plurality of interior wall objects responsive to the plurality of datasets and the one or more level objects. Referring additionally to FIG. 5, a method of generating machine-readable instructions to create a plurality of interior wall objects responsive to the plurality of datasets and the one or more level objects is presented. The method 500 may start at block 502 with identifying each face of the plurality of blocks generated at block 304 of FIG. 3 in the generation of the plurality of floor model objects, defining a plurality of block faces, each block face comprising boundary coordinates. In some embodiments, the plurality of block faces may be generated by creating rectangles centered at the center points from the geometric center dataset 1106 having dimensions defined as the dimensions for each room comprised by the geometric dimensions dataset 1108. The rectangles may be defined by a combination of lines/curves as described above. Those rectangles may then be extruded vertically to define the faces of the rooms. These steps are illustrated in FIGS. 20A-21B.

The method 500 may continue at block 504 with identifying each face of the maximum dimensional block model created in method 300 and at block 506 with identifying each block face of the plurality of blocks that at least partially overlaps an exterior face of the plurality of exterior faces, defining a first plurality of excluded faces. Determining the overlap may be performed by any method as is known in the art, including comparing the coordinates bounded by the respective faces and identifying any common coordinates.

Figure 22A:
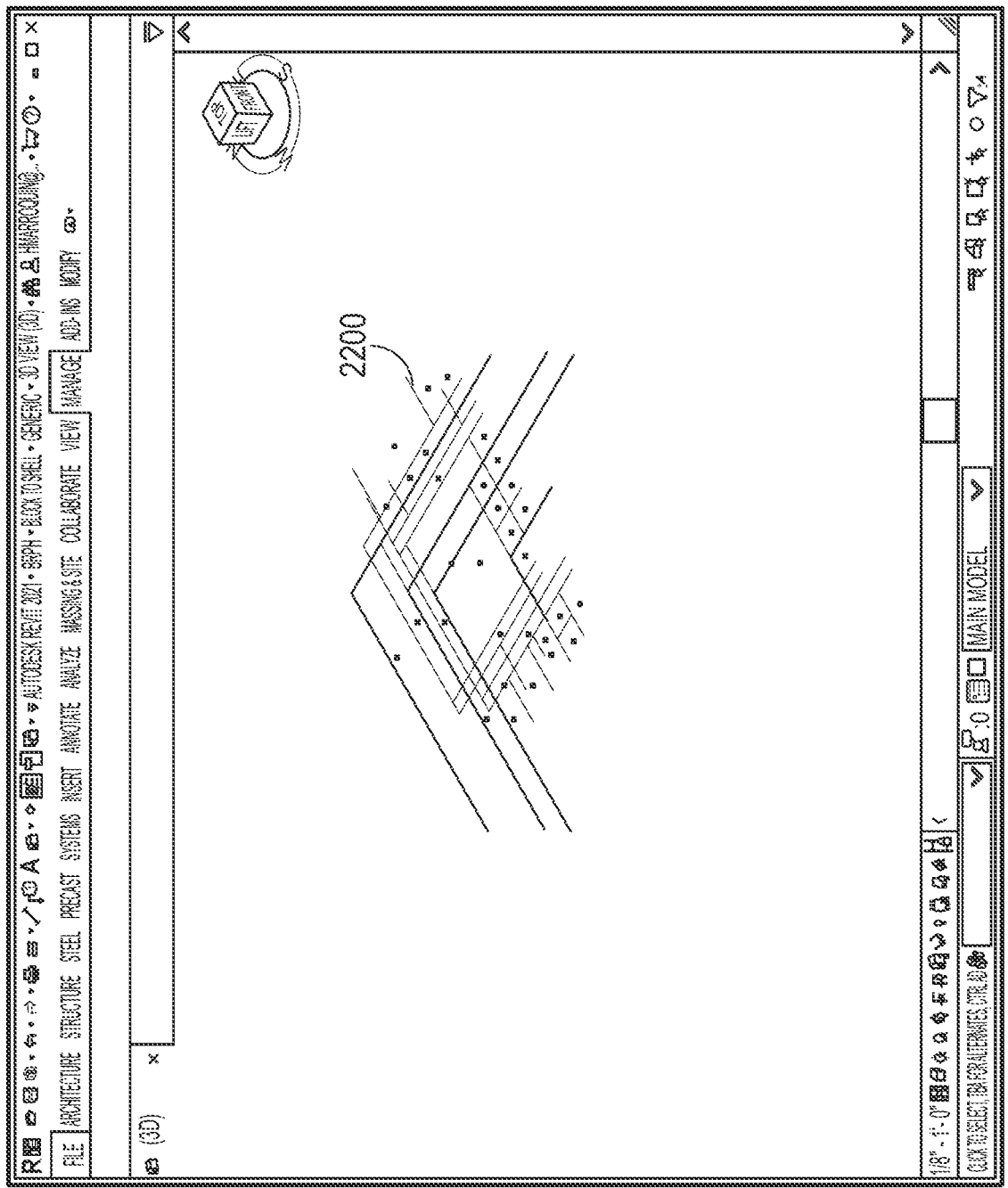
Figure 22B:
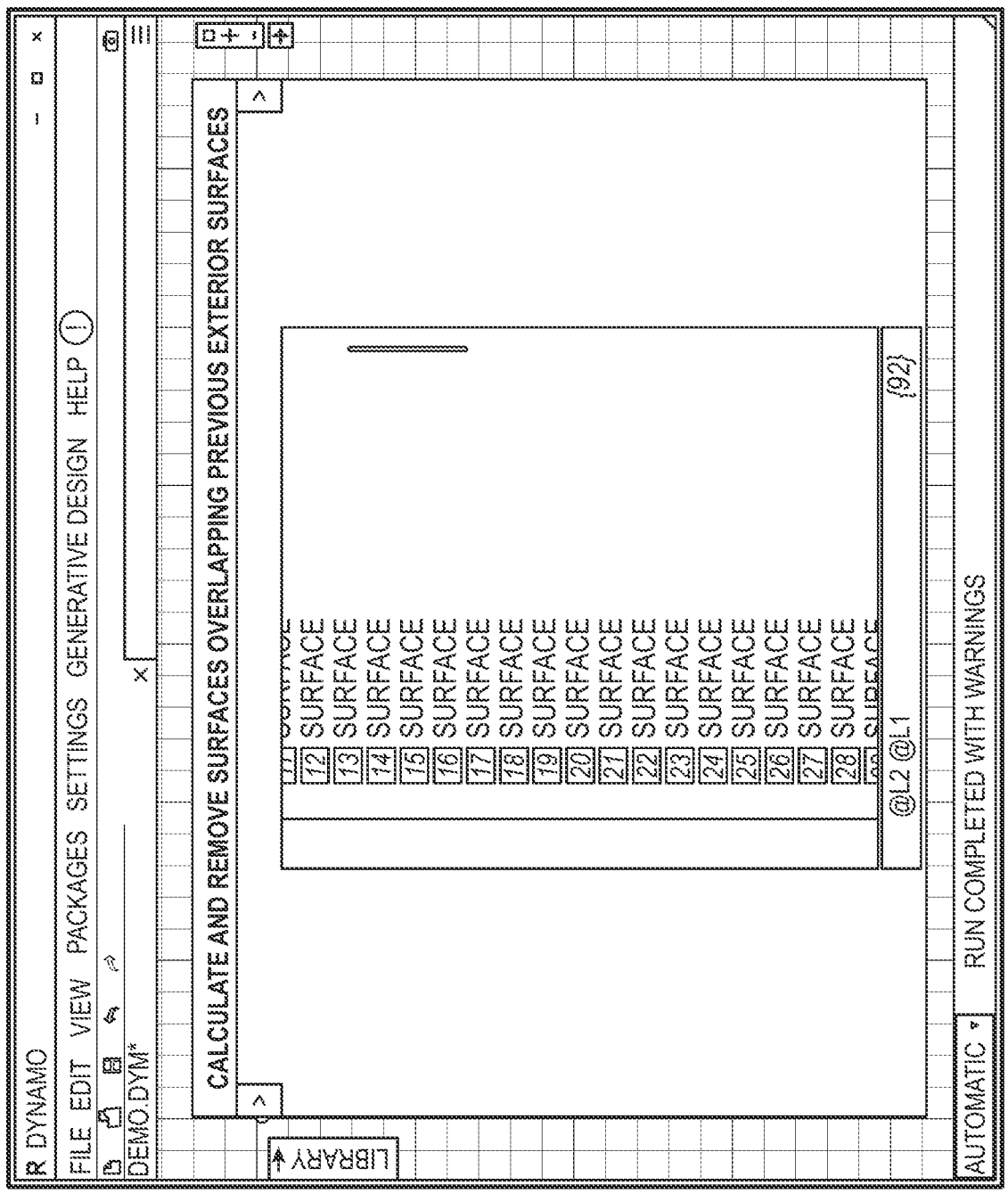
Figure 22C:
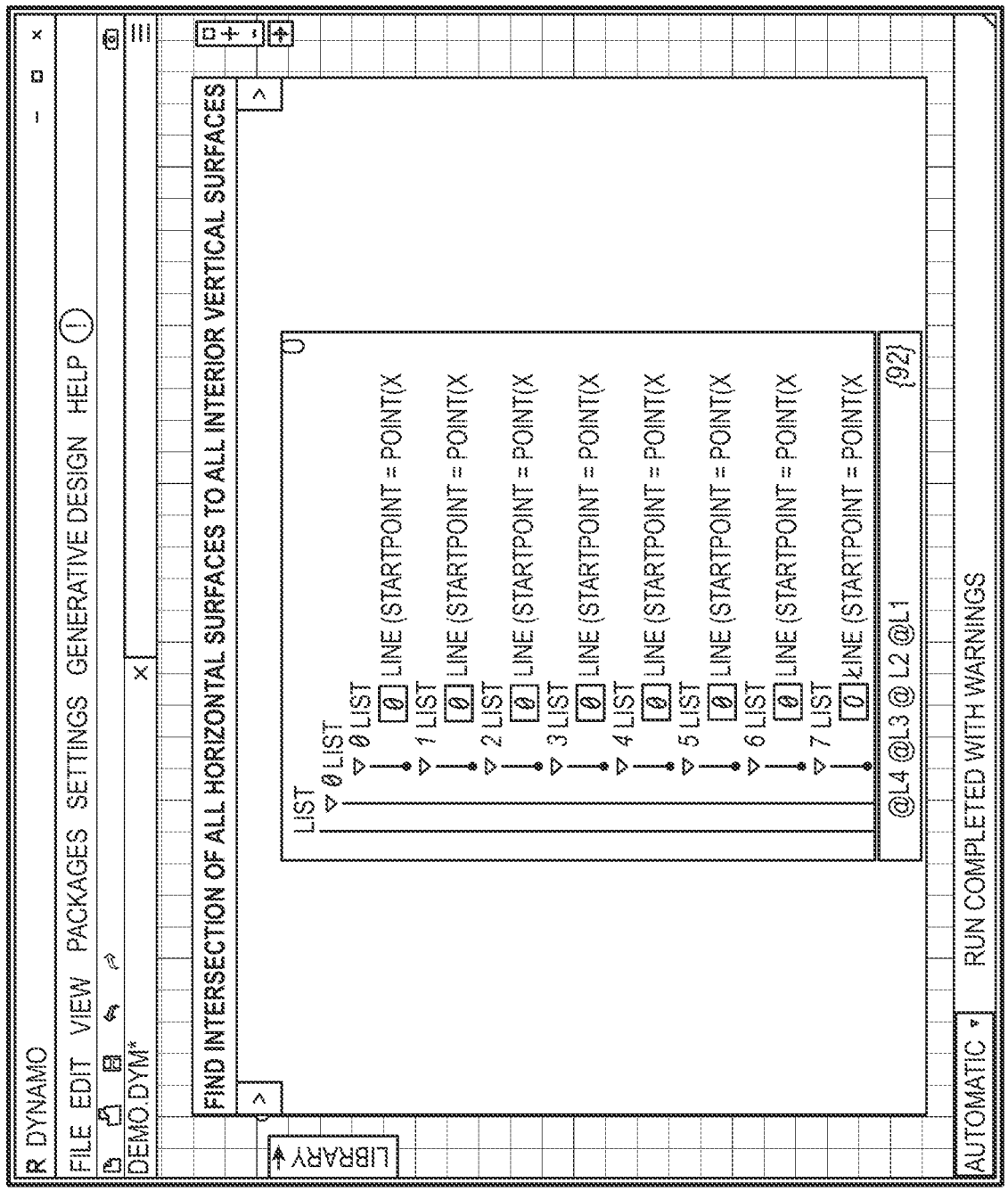

The method 500 may continue at block 508 with identifying each block face of the plurality of blocks that is parallel to the level objects, defining a second plurality of excluded faces. Faces that are parallel to the level objects will, in essence, be either floors or ceilings for their respective rooms and will not form the interior walls. Any method of determining whether a given surface is parallel to the level objects is contemplated and included within the scope of the invention. Alternatively, faces that have identical Z values at all points may be excluded. The method 500 may continue at block 510 with generating a list of interior faces, comprising removing each of the first plurality of excluded faces and the second plurality of excluded faces from the plurality of block faces. The method 500 may continue at block 512 with identifying intersections between the faces comprised by the list of interior faces and the interim floor markers, defining a plurality of intersection segments. Similar to above, the plurality of intersection segments may be lines/curves, but in this instance do not form a bounded object, instead having segments with terminal ends that are not connected to other segments. The functions to perform the steps of blocks 506, 508, 510, and 512 are shown in FIGS. 22B and C and the resulting plurality of intersection segments 2200 are shown in FIG. 22A.

In some embodiments, defining a plurality of interior wall objects may further comprise defining a face orientation vector for each block face in (X, Y, Z) coordinates, the face orientation vector being orthogonal to a plane defined by the boundary coordinates and identifying each block face having a face orientation vector having a non-zero value in only the Z coordinate, defining a second plurality of excluded faces.

Figure 23A:
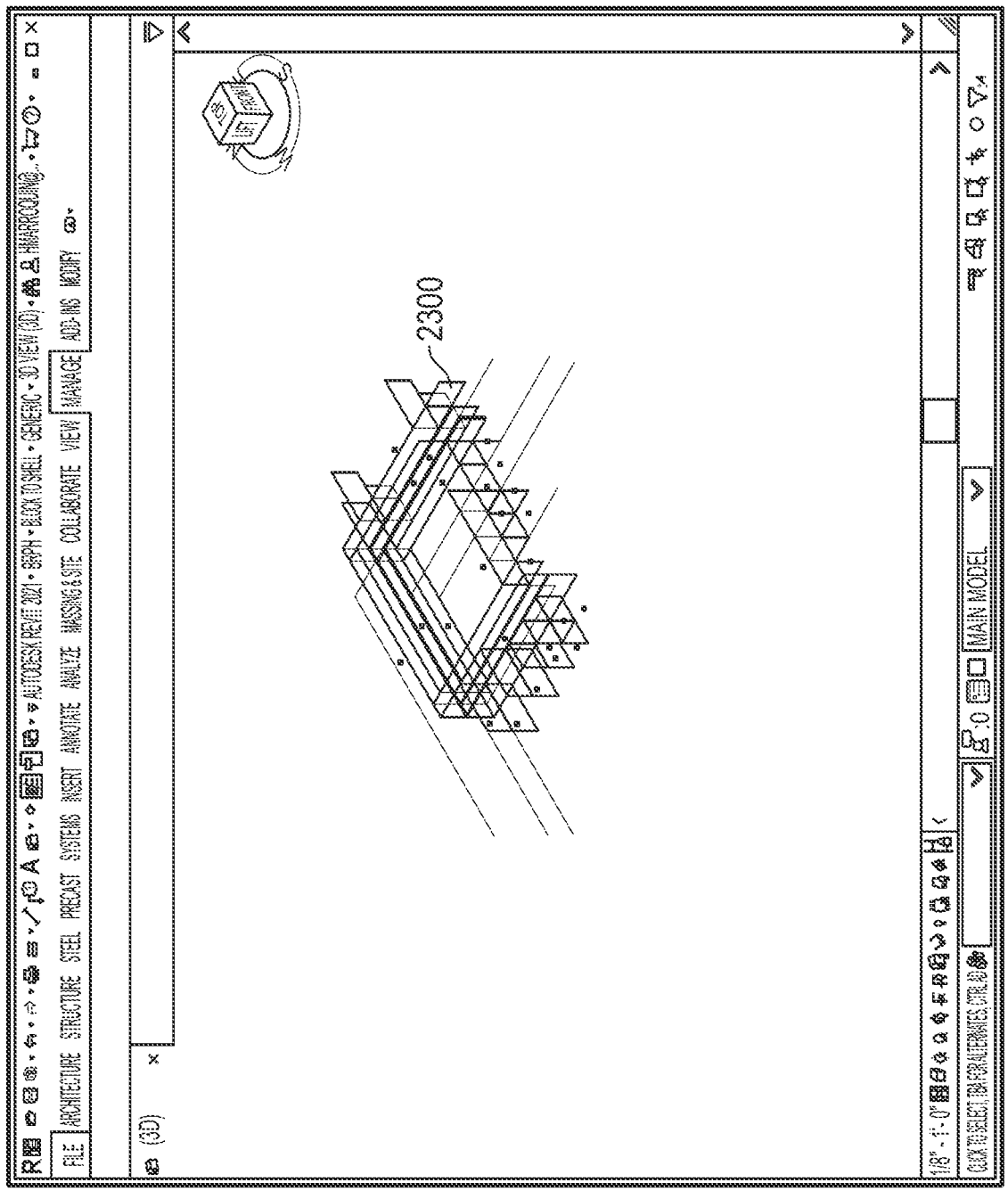
Figure 23B:
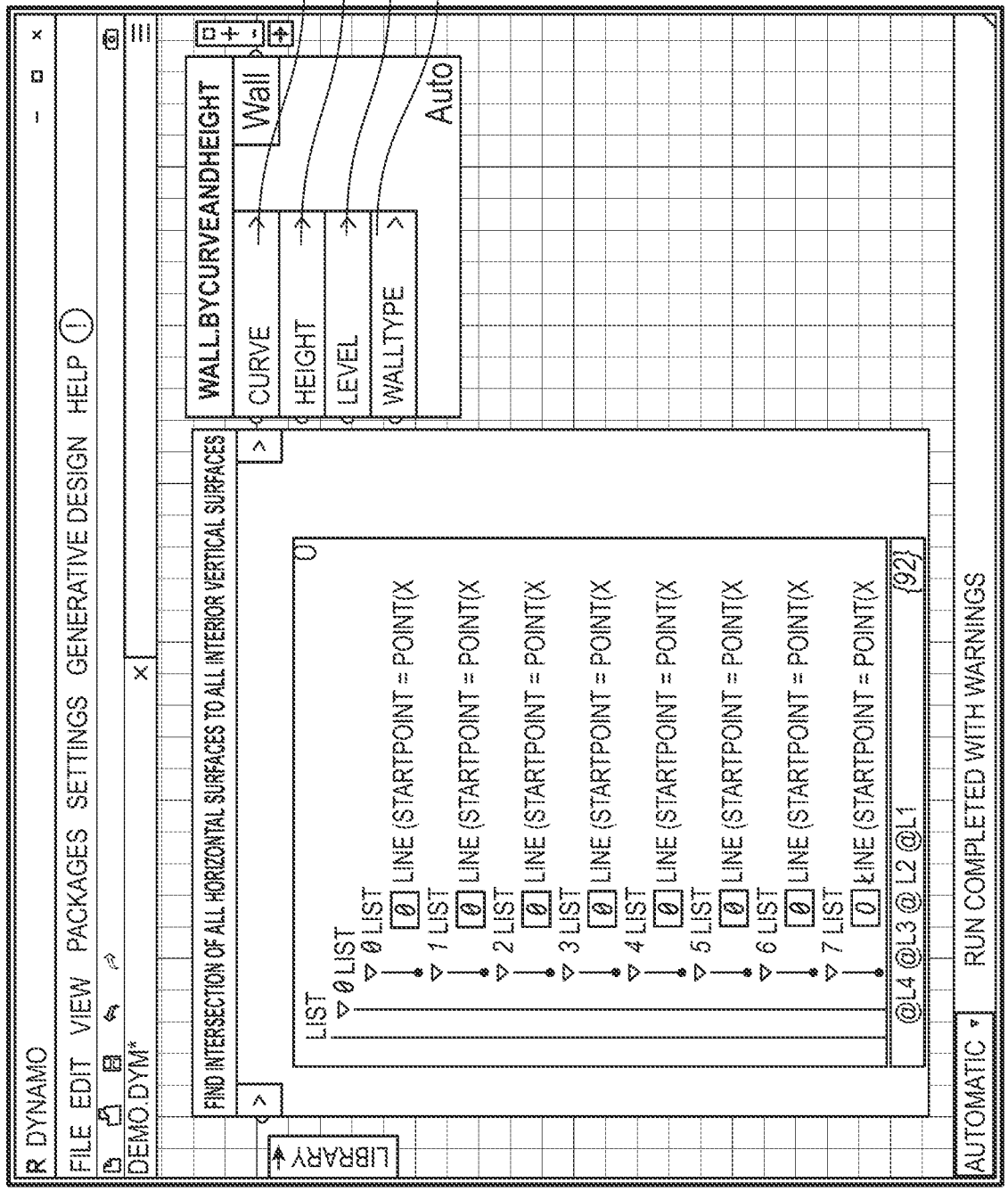

The method 500 may continue at block 514 with generating an interior wall object for each intersection segment of the plurality of intersection segments. The interior wall objects may be similar to exterior wall objects, having, as shown in FIG. 23B, a curve 2302 defining the length/width of the interior wall being one of the intersection segments of the plurality of intersection segments, a height 2304 defining how far from the its lowest point the wall extends vertically, and a level 2306 the interior wall object is associated with.

The method 500 may continue at block 516 with defining a base height value for each interior wall object, the base height value being a Z value of a lower level object the interior wall object intersects with. The method 500 may continue at block 518 with defining a top height value for each interior wall object, the top height value being one of a Z value of an upper level object the interior wall object intersects with, a height value received from a user, a default height value, and a maximum height of the architectural model. The plurality of interior wall objects generated by this function are shown 2300 in FIG. 23A. Furthermore, the material used for the wall 2308 may be selected by user input or a default wall material.

Figure 24A:
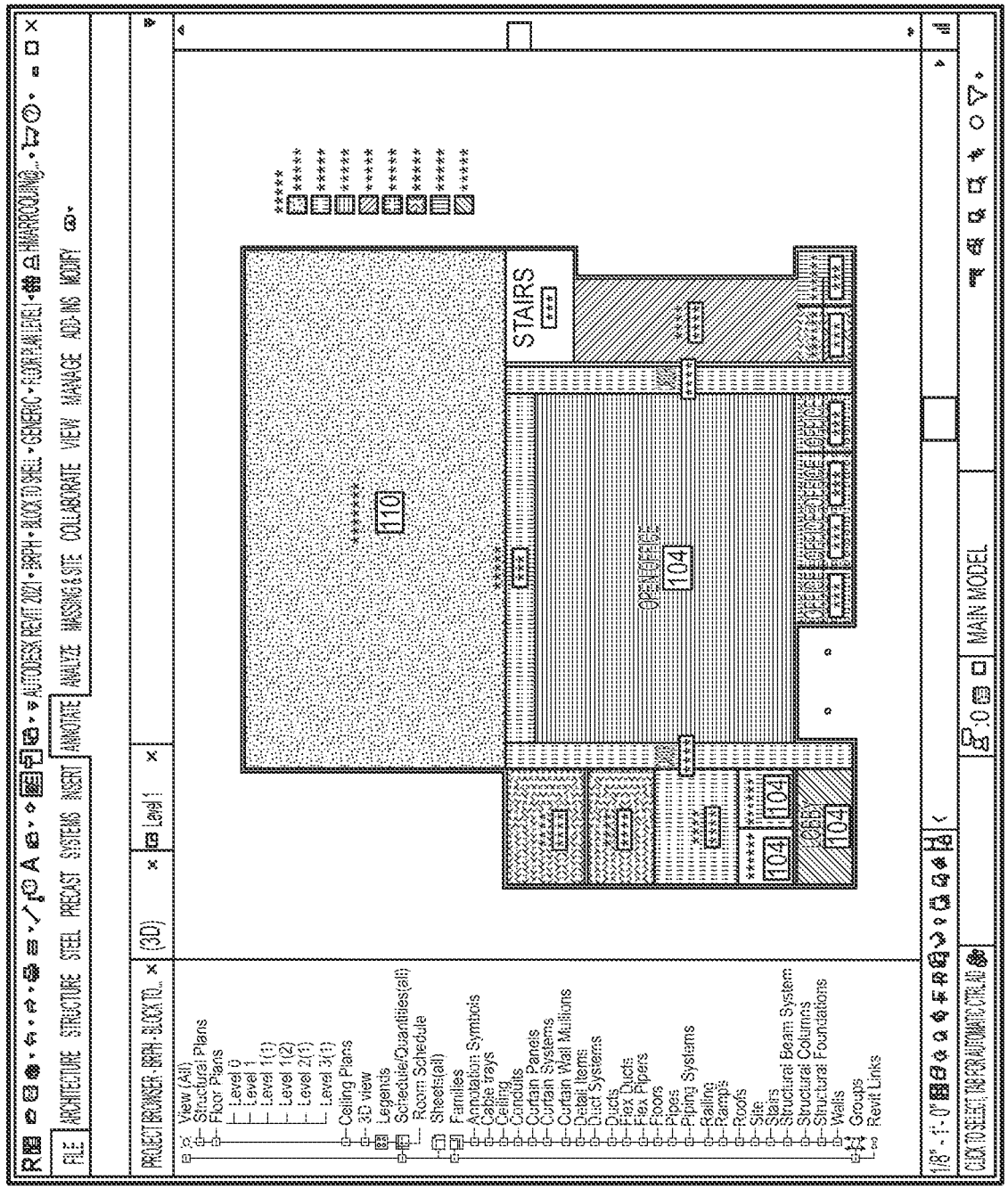
Figure 24B:
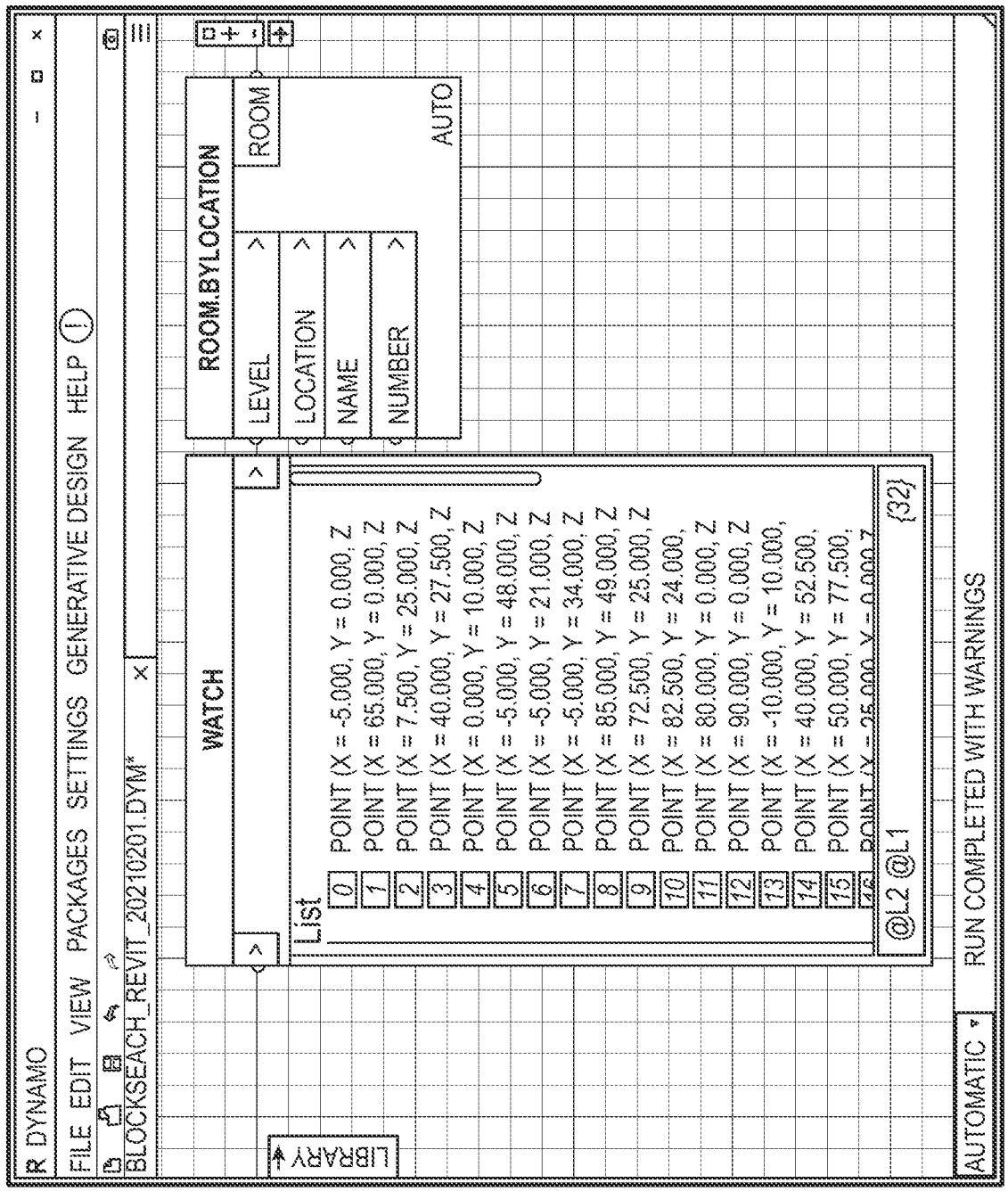

Returning to FIG. 1, the method 100 may continue at block 116 with generating machine-readable instructions to create a plurality of room objects responsive to the plurality of datasets, the one or more level objects, the plurality of exterior wall objects, and the plurality of interior wall objects. Generating such instructions may comprise defining a location of each room object, defining a level of each room object, assigning a name to each room object, and assigning a room number to each room object. The location of room may be defined by utilizing at least one of the geometric center dataset 1106 and the geometric dimensions dataset, specifically, matching at least one of the geometric center point of a room with a center point of a block of the plurality of blocks and the dimensions of the room with matching dimensions of a block of the plurality of blocks, where determinative and duplicate room dimensions do not exist. Defining a level of each room object may be accomplished by identifying one of a lowest Z location value associated with the room and a Z value equal to the center point Z value for the room, and identifying a level object having a matching Z value and defining the room object as having a level value equal to the level having the matching Z value. Assigning a name to each room object may comprise accessing the list of room names comprised by the room list dataset 1104, identifying the room name associated with the room object, and assigning the room name of the room object to be the same. Assigning a room number to each room object may be done by any manner as is known in the art, including sequential and non-sequential manners, patterns, and the like. For example, assigning a room number may comprise determining the number of discrete rooms comprised by the room list and sequentially assigning a room number to each room object such that a final room number assigned is equal to the number of discrete rooms comprised by the room list. The resulting room objects are shown in FIG. 24A and the function to generate them is shown in FIG. 24B.

In some embodiments, the plurality of datasets may further comprise a list of departments. Each room of the list of rooms may be associated with a department of the list of departments. In such embodiments, each room object have a department defined therefore. Defining a department for reach room object may comprise identifying a department of the list of departments associated with the room of the list of rooms each room object is associated with, defining a matched department, and assigning the matched department as a department for the room object.

The method 100 may continue at 118 with providing the instructions to create the plurality of level objects, the plurality of floor objects, the plurality of exterior wall objects, the plurality of interior wall objects, and the plurality of room objects to architectural modeling software that is configured to generate an architectural model in the format of the objects generated by method 100. Once so provided, the architectural modeling software will have sufficient instructions to generate a complete architectural model that may be represented graphically and manipulated by the user.

Figure 25:
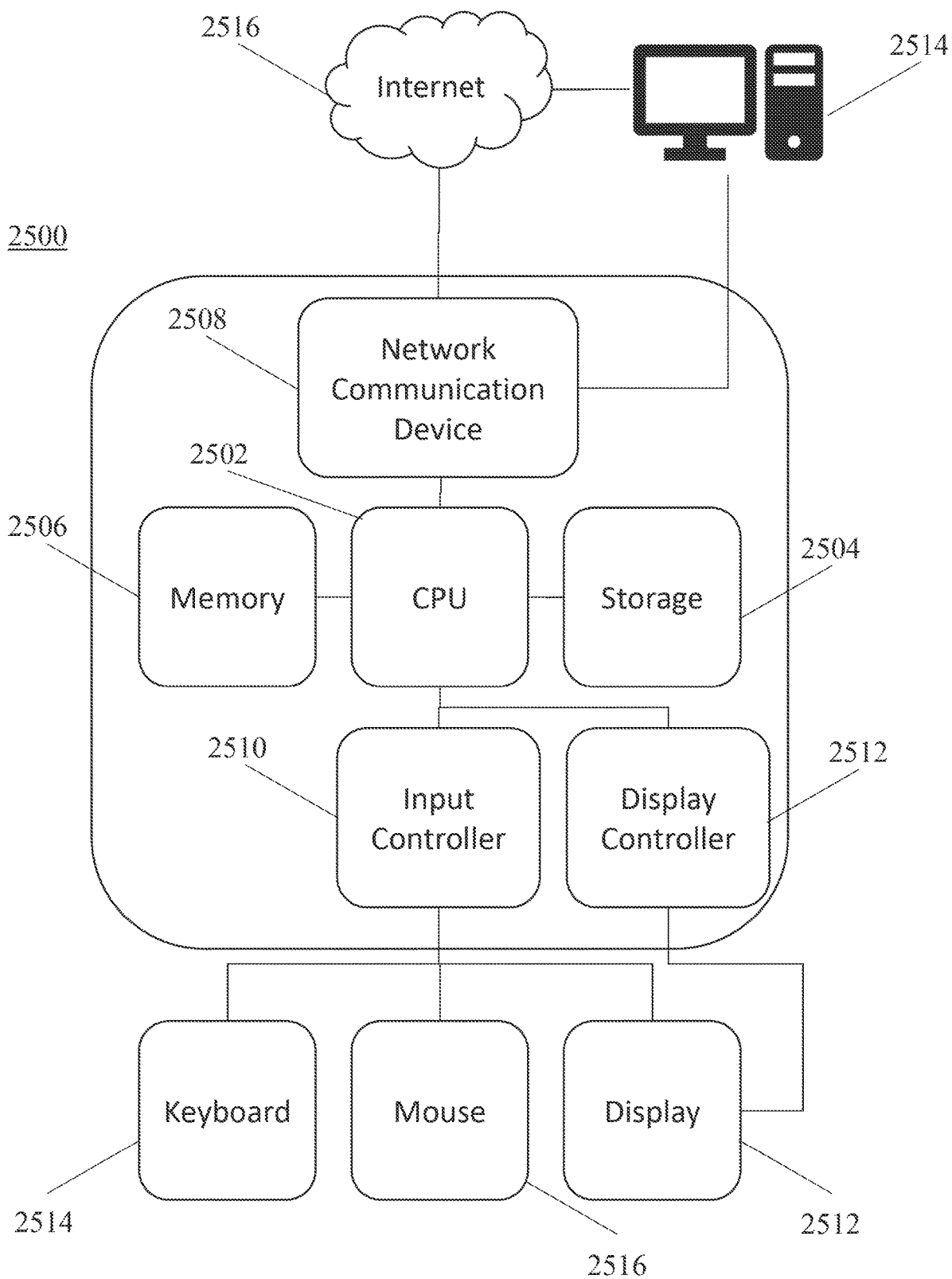
FIG. 25 is a schematic view of a computerized device operable to perform the methods shown and described in FIGS. 1-24B.

Referring now to FIG. 25, a system 2500 capable of performing the above methods is presented. The system 2500 may be a computerized device comprising a central processing unit 2502, a digital storage device 2504 positioned in communication with the CPU 2502, a memory device 2506 positioned in communication with the CPU 2502, a network communication device 2508 positioned in communication with the CPU 2502, and an input controller 2510 and a display controller 2512 each positioned in communication with the CPU 2502. The CPU 2502 may be any type of processor device as is known in the art, including, but not limited to, integrated circuits, microprocessors, field programmable gate arrays (FPGAs), and the like. The digital storage device 2504 may be any type of non-volatile, non-transitory digital storage device as is known in the art, including, but not limited to, hard disk drives, flash memory such as NAND flash and solid-state drives, optical disks, and the like. The memory device 2506 may be any type of volatile memory as is known in the art, including, but not limited to, random access memory (RAM), Static RAM (SRAM), Dynamic RAM (DRAM), and the like. The network communication device 2508 may be any device configured to communicate with a remote computerized device 2514, either directly or via a network, including private area networks, local area networks, and wide area networks, including the Internet 2516. Types of devices may include IEEE 802.xx-compliant devices, including Ethernet, Wi-Fi, Bluetooth, Zigbee, Z-Wave, and the like, cellular communication devices configured to comply with 4G and 5G standards, and all other digital communication devices as are known in the art.

The display controller 2512 may be a device operable to drive a display 2518 connected to the system 2500. Types of display controllers in video cards, integrated graphics, and the like. The input controller 2510 may be configured to receive user inputs from user input devices/peripherals attached to the system 2500, such as a keyboard 2514, mouse 2516, or a touchscreen display 2512. The input controller 2510 may be any device capable of receiving such inputs, including, but not limited to, universal serial bus (USB) devices, serial port devices, parallel port devices, PS/2 devices, FireWire devices, and Thunderbolt devices.

As noted, above, the human-readable text file of FIG. 10 may be generated by software that is comparatively less complex, and the instructions generated by the inventive method disclosed therein may be provided to architectural modeling software for the creation of an architectural model. It is contemplated and included within the scope of the invention that one or both of these software may be comprised by the system 2500 in addition to software configured to perform the inventive method. Moreover, it is contemplated and included within the scope of the invention that the method may comprise receiving a plurality of user inputs in the software configured to generate the human-readable text file sufficient to create text file. Moreover, it is contemplated and included within the scope of the invention that the method may comprise providing the machine-readable instructions to create the various architectural objects comprised by an architectural model to architectural modeling software running on the system 2500 and generating an architectural model accordingly, responsive to the instructions. Accordingly, it is contemplated and included within the scope of the invention that a user may create a simple architectural design using relatively simple software, generate a human-readable text file therefrom, convert that text file to machine-readable instructions to create an identical model in more sophisticated architectural modeling software, and create said model in the more sophisticated architectural modeling software all on the system 2500. It is further contemplated and included within the scope of the invention that the human-readable text file may be received from a remote computerized device 2514 via the network communication device 2508 and/or the machine-readable instructions to generate the architectural model objects may be transmitted to the remote computerized device 2514 via the network communication device 2508. In some embodiments, the system 2500 may be a remotely accessible server operable to perform the conversion operation as a service, with users sending the text file and receiving the machine-readable instructions without having direct access to the software performing the inventive method.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A method for generating computer-readable instructions to automatically generate a three-dimensional architectural model comprising:
   receiving a human-readable text file comprising a description of functional elements of a structure;
   parsing the text file to identify keywords comprised by the text file, defining identified key words;
   generating a plurality of datasets responsive to the identified key words, the plurality of datasets comprising:
      a dataset of a list of the rooms comprised by the architectural model;
      a dataset of a geometric center point for each room comprised by the architectural model, defining a center point list; and
      a dataset of geometric dimensions for each room comprised by the architectural model, defining a dimensions list;
   generating machine-readable instructions to create one or more level objects responsive to the plurality of datasets;
   generating machine-readable instructions to create one or more floor objects responsive to the plurality of datasets and the one or more level objects;
   generating machine-readable instructions to create a plurality of exterior wall objects responsive to the plurality of datasets and the one or more level objects;
   generating machine-readable instructions to create a plurality of interior wall objects responsive to the plurality of datasets and the one or more level objects;
   generating machine-readable instructions to create a plurality of room objects responsive to the plurality of datasets, the one or more level objects, the plurality of exterior wall objects, and the plurality of interior wall objects; and
   providing each of the machine-readable instructions to create one or more level objects, instructions to create one or more floor objects, instructions to create a plurality of exterior wall objects, instructions to create a plurality of interior wall objects, and instructions to create a plurality of room objects to architectural modeling software.

2. The method of claim 1 wherein:
   the geometric center point for each room is provided in (X, Y, Z) coordinates; and
   generating machine-readable instructions to create one or more level objects comprises:
      generating a dataset comprising a list of the Z-coordinate for each room, defining a Z-coordinate list;
      identifying each unique Z-coordinate comprised by the Z-coordinate list;
      assigning a level number to each unique Z-coordinate; and
      generating a dataset comprising a list of the level numbers, defining a level list.

3. The method of claim 2 wherein:
   the geometric dimensions of each room are provided in (X, Y, Z) coordinates;
   generating machine-readable instructions to create one or more floor objects comprises:
      generating a composite block model comprising:
         generating a block center point at the geometric center point for each room, resulting in a plurality of block center points;
         generating a block having dimensions equal to the geometric dimensions of each room, the block being centered at the block center point, resulting in a plurality of blocks; and
         merging the plurality of blocks into a single contiguous multifaceted mass, defining the composite block model;
      generating a maximum dimension block model being dimensioned and positioned such that its outer dimensions are coextensive with a maximum and a minimum (X, Y) coordinates of the composite block model;

generating a plurality of interim floor markers having (X, Y) dimensions that are coextensive with the (X, Y) dimensions of the maximum dimension block model, where each interim floor marker has a Z value equal to the Z value for each level object;

identifying intersections between the maximum dimension block model and the plurality of interim floor markers, defining interim floor marker intersections; and generating a plurality of floor model objects, each floor model object having a Z value equal to the Z value for one of the plurality of interim floor markers and a boundary defined by the interim floor marker intersections.

4. The method of claim 3 wherein generating a maximum dimension block model comprises:
identifying a plurality of faces comprised by the composite block model; and
removing the horizontal faces of the plurality of faces comprised by the composite block model.

5. The method of claim 3 wherein generating machine-readable instructions to create a plurality of exterior wall objects comprises:
generating a plurality of exterior wall objects based on the interim floor marker intersections;
defining a base height value for each exterior wall object, the base height value being equal to the Z value for the level object associated with each exterior wall; and
defining a top height value for each exterior wall object, the top height value being equal to the Z value for the level object having a level number that is the next greater level number than the level number of the level object associated with the exterior wall.

6. The method of claim 5 further comprising:
receiving an indication of an exterior wall type from a user for each exterior wall object, defining received exterior wall type indications; and
defining an exterior wall type for each exterior wall object responsive to the received exterior wall type indications.

7. The method of claim 5 wherein generating machine-readable instructions to create a plurality of interior wall objects comprises:
identifying each face of the plurality of blocks, defining a plurality of block faces, each block face comprising boundary coordinates;
identifying each face of the maximum dimension block model, defining a plurality of exterior faces;
identifying each block face of the plurality of blocks that at least partially overlaps an exterior face of the plurality of exterior faces, defining a first plurality of excluded faces;
identifying each block face of the plurality of blocks that is parallel to the level objects, defining a second plurality of excluded faces;
generating a list of interior faces, comprising removing each of the first plurality of excluded faces and the second plurality of excluded faces from the plurality of block faces;
identifying intersections between the interior faces comprised by the list of interior faces and the interim floor markers, defining a plurality of intersection segments;
generating an interior wall object for each intersection segment of the plurality of intersection segments;

defining a base height value for each interior wall object, the base height value being a Z value of a lower level object the interior wall object intersects with; and
defining a top height value for each interior wall object, the top height value being one of a Z value of an upper level object the interior wall object intersects with, a height value received from a user, a default height value, and a maximum height of the architectural model.

8. The method of claim 7 wherein generating machine-readable instructions to create a plurality of interior wall objects comprises:
defining a face orientation vector for each block face in (X, Y, Z) coordinates, the face orientation vector being orthogonal to a plane defined by the boundary coordinates; and
identifying each block face having a face orientation vector having a non-zero value in only the Z coordinate, defining a second plurality of excluded faces.

9. The method of claim 1 wherein generating machine-readable instructions to create a plurality of room objects comprises:
defining a location of each room object;
defining a level of each room object;
assigning a name to each room object; and
assigning a room number to each room object.

10. The method of claim 9 wherein:
each room object is associated with a room of the list of rooms;
the plurality of datasets further comprises a list of room names, each room name being associated with a room of the list of rooms;
defining a location of each room object comprises defining a center point for each room object that is equal to the center point of an associated room of the list of rooms;
defining a level of each room object comprises:
identifying a level object having a Z coordinate value equal to the center point Z value for the room, defining a selected level object; and
assigning the level number associated with the selected level object as the level for the room object;
assigning a name to each room object comprises:
identifying a name of the list of room names associated with the room with which the room object is associated, defining an identified name; and
assigning the room object a name that is the same as the identified name; and
assigning a room number comprises:
determining the number of discrete rooms comprised by the room list; and
sequentially assigning a room number to each room object such that a final room number assigned is equal to the number of discrete rooms comprised by the room list.

11. The method of claim 10 wherein the plurality of datasets further comprises a list of departments, wherein each room of the list of rooms is associated with a department of the list of departments, the method further comprising defining a department for each room object comprising:
identifying a department of the list of departments associated with the room of the list of rooms each room object is associated with, defining a matched department; and
assigning the matched department as a department for the room object.

12. A method for generating computer-readable instructions to automatically generate a three-dimensional architectural model comprising:
- receiving a human-readable text file comprising a description of functional elements of a structure;
- parsing the text file to identify keywords comprised by the text file, defining identified key words;
- generating a plurality of datasets responsive to the identified key words, the plurality of datasets comprising:
  - a dataset of a list of rooms comprised by the architectural model;
  - a dataset of a geometric center point provided in (X, Y, Z) coordinates for each room comprised by the architectural model, defining a center point list; and
  - a dataset of geometric dimensions for each room provided in (X, Y, Z) coordinates comprised by the architectural model, defining a dimensions list;
- generating machine-readable instructions to create one or more level objects responsive to the plurality of datasets by:
  - generating a dataset comprising a list of the Z-coordinate for each room, defining a Z-coordinate list;
  - identifying each unique Z-coordinate comprised by the Z-coordinate list;
  - assigning a level number to each unique Z-coordinate; and
  - generating a dataset comprising a list of the level numbers, defining a level list;
- generating machine-readable instructions to create one or more floor objects responsive to the plurality of datasets and the one or more level objects;
  - generating a composite block model comprising:
    - generating a block center point at the geometric center point for each room, resulting in a plurality of block center points;
    - generating a block having dimensions equal to the geometric dimensions of each room, the block being centered at the block center point, resulting in a plurality of blocks;
    - merging the plurality of blocks into a single contiguous multifaceted mass, defining the composite block model;
  - generating a maximum dimension block model being dimensioned and positioned such that its outer dimensions are coextensive with a maximum and a minimum (X, Y, Z) coordinates of the composite block model;
  - generating a plurality of interim floor markers having (X, Y) dimensions that are coextensive with the (X, Y) dimensions of the maximum dimension block model, where each interim floor marker has a Z value equal to the Z value for each level object;
  - identifying intersections between the maximum dimension block model and the plurality of interim floor markers, defining interim floor marker intersections; and
  - generating a plurality of floor model objects, each floor model object having a Z value equal to the Z value for one of the plurality of interim floor markers and a boundary defined by the interim floor marker intersections;
- generating machine-readable instructions to create a plurality of exterior wall objects responsive to the plurality of datasets and the one or more level objects, comprising:
  - generating a plurality of exterior wall objects based on the interim floor marker intersections;
  - defining a base height value for each exterior wall object, the base height value being equal to the Z value for the level object associated with each exterior wall; and
  - defining a top height value for each exterior wall object, the top height value being equal to the Z value for the level object having a level number that is the next greater level number than the level number of the level object associated with the exterior wall;
- generating machine-readable instructions to create a plurality of interior wall objects responsive to the plurality of datasets and the one or more level objects, comprising:
  - identifying each face of the plurality of blocks, defining a plurality of block faces, each block face comprising boundary coordinates;
  - identifying each face of the maximum dimension block model, defining a plurality of exterior faces;
  - identifying each block face that at least partially overlaps an exterior face of the plurality of exterior faces, defining a first plurality of excluded faces;
  - identifying each block face that is parallel to the level objects, defining a second plurality of excluded faces;
  - generating a list of interior faces, comprising removing each of the first plurality of excluded faces and the second plurality of excluded faces from the plurality of block faces;
  - identifying intersections between the interior faces comprised by the list of interior faces and the interim floor markers, defining a plurality of intersection segments;
  - generating an interior wall object for each intersection segment of the plurality of intersection segments;
  - defining a base height value for each interior wall object, the base height value being a Z value of a lower level object the interior wall object intersects with; and
  - defining a top height value for each interior wall object, the top height value being one of a Z value of an upper level object the interior wall object intersects with, a height value received from a user, a default height value, and a maximum height of the architectural model;
- generating machine-readable instructions to create a plurality of room objects responsive to the plurality of datasets, the one or more level objects, the plurality of exterior wall objects, and the plurality of interior wall objects; and
- providing each of the machine-readable instructions to create one or more level objects, instructions to create one or more floor objects, instructions to create a plurality of exterior wall objects, instructions to create a plurality of interior wall objects, and instructions to create a plurality of room objects to architectural modeling software.

13. The method of claim 12 further comprising:
- receiving an indication of an exterior wall type from a user for each exterior wall object, defining received exterior wall type indications; and
- defining an exterior wall type for each exterior wall object responsive to the received exterior wall type indications.

14. The method of claim 12 wherein generating machine-readable instructions to create a plurality of interior wall objects comprises:

defining a face orientation vector for each block face in (X, Y, Z) coordinates, the face orientation vector being orthogonal to a plane defined by the boundary coordinates; and identifying each block face having a face orientation vector having a non-zero value in only the Z coordinate, defining a second plurality of excluded faces.

15. The method of claim 12 wherein generating a maximum dimension block model comprises:

identifying a plurality of faces comprised by the composite block model; and removing the horizontal faces of the plurality of faces comprised by the composite block model.

16. The method of claim 12 wherein generating machine-readable instructions to create a plurality of room objects comprises:

defining a location of each room object;
defining a level of each room object;
assigning a name to each room object; and
assigning a room number to each room object.

17. The method of claim 16 wherein:

each room object is associated with a room of the list of rooms;

the plurality of datasets further comprises a list of room names, each room name being associated with a room of the list of rooms defining a location of each room object comprises defining a center point for each room object that is equal to the center point of an associated room of the list of rooms;

defining a level of each room object comprises:
identifying a level object having a Z coordinate value equal to the center point Z value for the room, defining a selected level object; and
assigning the level number associated with the selected level object as the level for the room object;

assigning a name to each room object comprises:
identifying a name of the list of room names associated with the room with which the room object is associated, defining an identified name; and
assigning the room object a name that is the same as the identified name; and assigning a room number comprises:
determining the number of discrete rooms comprised by the room list; and
sequentially assigning a room number to each room object such that a final room number assigned is equal to the number of discrete rooms comprised by the room list.

18. The method of claim 17 wherein the plurality of datasets further comprises a list of departments, wherein each room of the list of rooms is associated with a department of the list of departments, the method further comprising defining a department for each room object comprising:

identifying a department of the list of departments associated with the room of the list of rooms each room object is associated with, defining a matched department; and assigning the matched department as a department for the room object.

19. A method for generating computer-readable instructions to automatically generate a three-dimensional architectural model comprising:

receiving a human-readable text file comprising a description of functional elements of a structure;

parsing the text file to identify keywords comprised by the text file, defining identified key words;

generating a plurality of datasets responsive to the identified key words, the plurality of datasets comprising:
a dataset of a list of rooms comprised by the architectural model;
a dataset of a geometric center point provided in (X, Y, Z) coordinates for each room comprised by the architectural model, defining a center point list; and
a dataset of geometric dimensions for each room provided in (X, Y, Z) coordinates comprised by the architectural model, defining a dimensions list;

generating machine-readable instructions to create one or more level objects responsive to the plurality of datasets by:
generating a dataset comprising a list of the Z-coordinate for each room, defining a Z-coordinate list;
identifying each unique Z-coordinate comprised by the Z-coordinate list;
assigning a level number to each unique Z-coordinate; and
generating a dataset comprising a list of the level numbers, defining a level list;

generating machine-readable instructions to create one or more floor objects responsive to the plurality of datasets and the one or more level objects;
generating a composite block model comprising:
generating a block center point at the geometric center point for each room, resulting in a plurality of block center points;
generating a block having dimensions equal to the geometric dimensions of each room, the block being centered at the block center point, resulting in a plurality of blocks;
merging the plurality of blocks into a single contiguous multifaceted mass, defining the composite block model;

generating a maximum dimension block model being dimensioned and positioned such that its outer dimensions are coextensive with a maximum and a minimum (X, Y, Z) coordinates of the composite block model, comprising:
identifying a plurality of faces comprised by the composite block model; and
removing the horizontal faces of the plurality of faces comprised by the composite block model;

generating a plurality of interim floor markers having (X, Y) dimensions that are coextensive with the (X, Y) dimensions of the maximum dimension block model, where each interim floor marker has a Z value equal to the Z value for each level object;

identifying intersections between the maximum dimension block model and the plurality of interim floor markers, defining interim floor marker intersections; and generating a plurality of floor model objects, each floor model object having a Z value equal to the Z value for one of the plurality of interim floor markers and a boundary defined by the interim floor marker intersections;

generating machine-readable instructions to create a plurality of exterior wall objects responsive to the plurality of datasets and the one or more level objects, comprising:
generating a plurality of exterior wall objects based on the interim floor marker intersections;

defining a base height value for each exterior wall object, the base height value being equal to the Z value for the level object associated with each exterior wall;

defining a top height value for each exterior wall object, the top height value being equal to the Z value for the level object having a level number that is the next greater level number than the level number of the level object associated with the exterior wall;

receiving an indication of an exterior wall type from a user for each exterior wall object, defining received exterior wall type indications; and defining an exterior wall type for each exterior wall object responsive to the received exterior wall type indications generating machine-readable instructions to create a plurality of interior wall objects responsive to the plurality of datasets and the one or more level objects, comprising:

identifying each face of the plurality of blocks, defining a plurality of block faces, each block face comprising boundary coordinates;

identifying each face of the maximum dimension block model, defining a plurality of exterior faces;

identifying each block face that at least partially overlaps an exterior face of the plurality of exterior faces, defining a first plurality of excluded faces;

identifying each block face that is parallel to the level objects, defining a second plurality of excluded faces;

generating a list of interior faces, comprising removing each of the first plurality of excluded faces and the second plurality of excluded faces from the plurality of block faces;

identifying intersections between the interior faces comprised by the list of interior faces and the interim floor markers, defining a plurality of intersection segments;

generating an interior wall object for each intersection segment of the plurality of intersection segments;

defining a base height value for each interior wall object, the base height value being a Z value of a lower level object the interior wall object intersects with; and defining a top height value for each interior wall object, the top height value being one of a Z value of an upper level object the interior wall object intersects with, a height value received from a user, a default height value, and a maximum height of the architectural model;

generating machine-readable instructions to create a plurality of room objects responsive to the plurality of datasets, the one or more level objects, the plurality of exterior wall objects, and the plurality of interior wall objects; and providing each of the machine-readable instructions to create one or more level objects, instructions to create one or more floor objects, instructions to create a plurality of exterior wall objects, instructions to create a plurality of interior wall objects, and instructions to create a plurality of room objects to architectural modeling software.

* * * * *